US012779345B2

(12) United States Patent
Wang

(10) Patent No.: US 12,779,345 B2
(45) Date of Patent: Nov. 3, 2026

(54) TEAM FORMATION APPOINTMENT

(71) Applicant: Tencent Technology (Shenzhen) Company Limited, Shenzhen (CN)

(72) Inventor: Xinfeng Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 87 days.

(21) Appl. No.: 18/740,395

(22) Filed: Jun. 11, 2024

(65) Prior Publication Data

US 2024/0325931 A1 Oct. 3, 2024

Related U.S. Application Data

(63) Continuation of application No. PCT/CN2023/089334, filed on Apr. 19, 2023.

(30) Foreign Application Priority Data

Jun. 23, 2022 (CN) ......................... 202210718627.5

(51) Int. Cl.
*A63F 13/00* (2014.01)
*A63F 13/533* (2014.01)
(Continued)

(52) U.S. Cl.
CPC .......... *A63F 13/795* (2014.09); *A63F 13/533* (2014.09); *A63F 13/537* (2014.09);
(Continued)

(58) Field of Classification Search
None
See application file for complete search history.

(56) References Cited

U.S. PATENT DOCUMENTS

| | | | | |
|---|---|---|---|---|
| 7,824,268 B2 * | 11/2010 | Harvey | ................. | A63F 13/352 463/9 |
| 9,199,173 B2 * | 12/2015 | Jensen | .................. | A63F 13/335 |

(Continued)

FOREIGN PATENT DOCUMENTS

| | | | |
|---|---|---|---|
| CN | 111760296 A | 10/2020 | |
| CN | 113144598 A | 7/2021 | |

(Continued)

OTHER PUBLICATIONS

Office Action received for Japanese Patent Application No. 2024-532699, mailed on May 27, 2025, 20 pages (12 pages of English Translation and 8 pages of Original Document).

(Continued)

*Primary Examiner* — Paul A D'Agostino
(74) *Attorney, Agent, or Firm* — ARENTFOX SCHIFF LLP

(57) ABSTRACT

A method includes displaying a team formation appointment control associated with a first player in a virtual scene, the team formation appointment control is configured for making an appointment of forming a target team comprising the first player. The method further comprises receiving one or more team attribute setting operations when the team formation appointment control is triggered and determining a set of team attributes of the target team based on the one or more team attribute setting operations. The set of team attributes includes at least an appointed formation time of the target team. The method also includes displaying, when an appointment confirm instruction is triggered, formation appointment information of the target team including the set of team attributes, the formation appointment information indicates a formation of the target team with the first player and one or more other player being scheduled at the appointed formation time.

20 Claims, 20 Drawing Sheets

(51) Int. Cl.

| | |
|---|---|
| ***A63F 13/537*** | (2014.01) |
| ***A63F 13/795*** | (2014.01) |
| ***G06F 3/0482*** | (2013.01) |
| ***G06F 3/0484*** | (2022.01) |
| *A63F 13/48* | (2014.01) |
| *A63F 13/798* | (2014.01) |

(52) U.S. Cl.

CPC .......... *G06F 3/0482* (2013.01); *G06F 3/0484* (2013.01); *A63F 13/48* (2014.09); *A63F 13/798* (2014.09)

(56) References Cited

U.S. PATENT DOCUMENTS

| | | | | |
|---|---|---|---|---|
| 9,795,887 | B2 * | 10/2017 | Lin | A63F 13/75 |
| 10,032,338 | B2 * | 7/2018 | Lark | G07F 17/3269 |
| 10,549,200 | B2 * | 2/2020 | Labate | H04L 65/612 |
| 10,997,494 | B1 * | 5/2021 | Ng | A63F 13/75 |
| 11,020,671 | B2 * | 6/2021 | Cruz | A63F 13/795 |
| 11,071,919 | B2 * | 7/2021 | Willette | A63F 13/85 |
| 2010/0113145 | A1 * | 5/2010 | Yan | H04L 67/141 463/29 |
| 2011/0312395 | A1 * | 12/2011 | Nakamura | A63F 13/828 463/4 |
| 2013/0090171 | A1 * | 4/2013 | Holton | A63F 13/795 463/42 |
| 2014/0025732 | A1 * | 1/2014 | Lin | A63F 13/795 709/204 |
| 2016/0055710 | A1 * | 2/2016 | Paradise | G07F 17/3225 463/25 |
| 2017/0001111 | A1 * | 1/2017 | Willette | A63F 13/49 |
| 2017/0282082 | A1 * | 10/2017 | Hubbard | G06Q 10/101 |
| 2018/0361248 | A1 * | 12/2018 | Nomura | A63F 13/847 |
| 2020/0016495 | A1 * | 1/2020 | Cruz | A63F 13/533 |
| 2020/0143197 | A1 * | 5/2020 | Zmijewski | G06N 3/09 |
| 2020/0244711 | A1 * | 7/2020 | Engel | G06F 3/0482 |
| 2021/0060438 | A1 * | 3/2021 | Oe | A63F 13/69 |
| 2021/0069597 | A1 * | 3/2021 | Paquet | G06Q 30/02 |
| 2021/0205706 | A1 * | 7/2021 | Lutz | A63F 13/537 |
| 2021/0205711 | A1 * | 7/2021 | Thielbar | A63F 13/497 |
| 2021/0354033 | A1 * | 11/2021 | Ono | A63F 13/358 |
| 2022/0305390 | A1 * | 9/2022 | Tripathi | A63F 13/795 |
| 2023/0051099 | A1 * | 2/2023 | Wu | A63F 13/86 |
| 2023/0233947 | A1 * | 7/2023 | Thielbar | A63F 13/86 463/40 |

FOREIGN PATENT DOCUMENTS

| | | | |
|---|---|---|---|
| CN | 113663325 | A | 11/2021 |
| CN | 114285681 | A | 4/2022 |
| JP | 2003-199977 | A | 7/2003 |
| JP | 2017-080046 | A | 5/2017 |
| JP | 2017-118980 | A | 7/2017 |
| JP | 6680379 | B1 | 4/2020 |
| JP | 7036970 | B1 | 3/2022 |
| JP | 2022-078750 | A | 5/2022 |
| JP | 2022-084883 | A | 6/2022 |

OTHER PUBLICATIONS

Unknown, "How to send a friend request and its benefits [Bleach Soul Rising]", Gamewith, Available online at <https://gamewith.jp/bleachsoulrising/article/show/234880>, Oct. 28, 2020, 8 pages (Original Document Only).

International Search Report received for PCT Patent Application No. PCT/CN2023/089334, mailed on Aug. 9, 2023, 6 pages.

Office Action received for Chinese Patent Application No. 202210718627.5, mailed on Jul. 20, 2026, 29 pages (15 pages of English Translation and 14 pages of Original Document).

* cited by examiner

TEAM FORMATION APPOINTMENT

RELATED APPLICATIONS

The present application is a continuation of International Application No. PCT/CN2023/089334, filed on Apr. 19, 2023, which claims priority to Chinese Patent Application No. 202210718627.5, filed on Jun. 23, 2022. The entire disclosures of the prior applications are hereby incorporated by reference.

FIELD OF THE TECHNOLOGY

This disclosure relates to the technical field of virtualizations and human-computer interactions of computer technologies, including techniques for a team formation appointment.

BACKGROUND OF THE DISCLOSURE

With the development of computer technologies, an electronic device may achieve more diverse and vivid virtual scenes. A user may have virtualized feelings in vision, hearing, and other aspects in a virtual scene, and may control an interaction game between virtual players of one team in the virtual scene and virtual players of other teams, so as to obtain feedbacks.

In the related technology, team formation in the virtual scene is real-time. To form a team, all parties need to be online at the same time. When the user intends to form a team at a time point in the future, the user has to repeatedly chat with many other users through a chat function or social communication software in the virtual scene to make an appointment on the time point. At the appointed time point, all the users having the appointment are online to form the team. This is essentially real-time, and an entire process is complex and inefficient in human-computer interaction.

SUMMARY

Embodiments of this disclosure provide a team formation appointment method and apparatus in a virtual scene, an electronic device, a computer-readable storage medium, and a computer program product, and can achieve appointed team formation in the virtual scene and improve the human-computer interaction efficiency.

Technical solutions in the embodiments of this disclosure can be implemented as follows.

Some aspects of the disclosure provide a method for team formation appointment. The method includes displaying, by an electronic device associated with a first player in a virtual scene that supports team based battles, a team formation appointment control associated with the first player, the team formation appointment control is configured for making an appointment of forming a target team comprising the first player. The method further comprises receiving one or more team attribute setting operations when the team formation appointment control is triggered and determining a set of team attributes of the target team based on the one or more team attribute setting operations. The set of team attributes includes at least an appointed formation time of the target team. The method also includes displaying, when an appointment confirm instruction is triggered, formation appointment information of the target team including the set of team attributes, the formation appointment information indicates a formation of the target team with the first player and one or more other player being scheduled at the appointed formation time, the one or more other players join the target team based on the formation appointment information, the target team is involved in a battle with another team in the virtual scene.

Some aspects of the disclosure provide another method for team formation appointment. The method includes receiving, by an electronic device associated with a specific player in a virtual scene that includes team based battles, formation appointment information of a target team in the virtual scene. The target team comprises at least a first team player, for example, a founder of the target team. The formation appointment information includes a set of team attributes of the target team, the set of team attributes includes at least an appointed formation time of the target team. The method also includes displaying the formation appointment information of the target team and displaying applying result prompt information of the specific player when a team applying operation associated with the specific player is performed based on the formation appointment information, the applying result prompt information indicates a result of the specific player applying to join the target team.

The embodiments of this disclosure further provide a team formation appointment apparatus in a virtual scene. The apparatus includes:

- a first display module, configured to display a team formation appointment control of a first player, the team formation appointment control being configured for making an appointment on forming a target team including the first player;
- an attribute setting module, configured to determine a set attribute as a team attribute of the target team based on the team formation appointment control in response to a team attribute setting operation, the team attribute at least including appointed formation time of the target team; and
- a processing module, configured to display, in response to an appointment confirm instruction triggered based on the set team attribute, formation appointment information carrying the team attribute,
- the formation appointment information being configured for indicating formation of the target team including the first player at the appointed formation time and configured for allowing a second player to apply to join the target team based on the formation appointment information.

The embodiments of this disclosure further provide a team formation appointment apparatus in a virtual scene. The apparatus includes:

- a third display module, configured to display formation appointment information carrying a team attribute of a target team;
- the team attribute at least including an appointed formation time, and the formation appointment information being configured for indicating formation of the target team including the first player at the appointed formation time; and
- an applying module, configured to display applying result prompt information of the second player when a team applying operation triggered by a second player based on the formation appointment information is received, the applying result prompt information being configured for prompting a result of applying to join the target team by the second player.

The embodiments of this disclosure further provide an electronic device, including:

a memory, configured to store executable instructions; and a processor, configured to implement, when executing the executable instructions stored in the memory, the team formation appointment method in the virtual scene provided by the embodiments of this disclosure.

The embodiments of this disclosure further provide a non-transitory computer-readable storage medium, having executable instructions stored therein. The executable instructions, when executed by a processor, implement the team formation appointment method in the virtual scene provided by the embodiments of this disclosure.

The embodiments of this disclosure further provide a computer program product, including a computer program or instructions. The computer program or instructions, when executed by a processor, implement the team formation appointment method in the virtual scene provided by the embodiments of this disclosure.

The embodiments of this disclosure have the following beneficial effects:

A function of appointing formation of a target team is provided by displaying a team formation appointment control. A user may set, based on the team formation appointment control, a team attribute, which includes appointed formation time, for a team appointed to be formed; and furthermore, when an appointment confirm instruction is triggered, formation appointment information configured for indicating formation of the target team at the appointed formation time is displayed, so that a second player can apply to join the target team based on the formation appointment information. In this way, a first player may achieve appointed team formation in a virtual scene based on the provided function of appointing formation of a target team; and the second player in the virtual scene may apply to join the target team according to the formation appointment information. The user does not need to repeatedly chat with others about team formation, so that the human-computer interaction efficiency and the team formation appointment efficiency are improved.

DESCRIPTION OF EMBODIMENTS

Figure 1A:
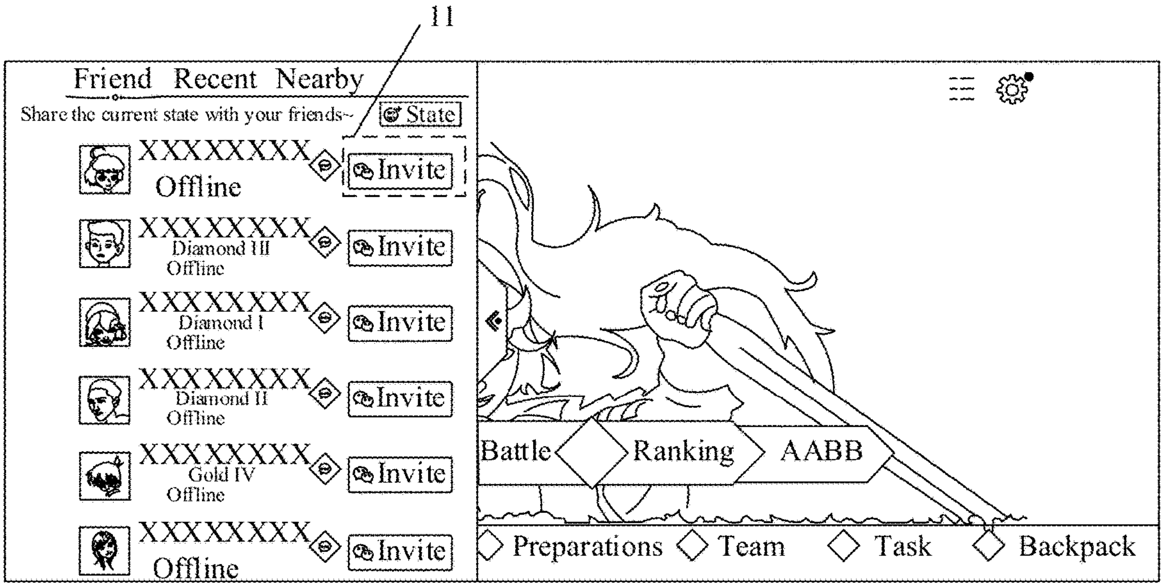
FIG. 1A to FIG. 1C are schematic diagrams of an interface of team formation in a virtual scene according to the related technology.

The following describes technical solutions in embodiments of this disclosure with reference to the accompanying drawings. The described embodiments are some of the embodiments of this disclosure rather than all of the embodiments. Other embodiments are within the scope of this disclosure. In the following description, the term "some embodiments" describes subsets of all possible embodiments, but "some embodiments" may be the same subset or different subsets of all the possible embodiments, and can be combined with each other without conflict.

In the following description, the term "first\ second\third" is merely used to distinguish similar players and does not represent a specific order of the players. "First\second\third" can be interchanged in a specific order or precedence where permitted, to enable the embodiments of this disclosure described herein to be implemented in a sequence other than that illustrated or described here.

Terms used herein are merely intended to describe objectives of the embodiments of this disclosure, but are not intended to limit this disclosure.

Before the embodiments of this disclosure are further described in detail, a description is made on nouns and terms in the embodiments of this disclosure, and the nouns and terms in the embodiments of this disclosure are applicable to the following explanations.

(1) Client: It is an application program run in a terminal to provide various services, such as a game client, an instant messaging client, and a video playing client.

(2) Being in response to: It is configured for representing a condition or state on which an executed operation depends. When the dependent condition or state is satisfied, one or more of the executed operations can be real-time or have a set delay. Unless otherwise specified, there is no restriction on the order of execution of multiple executed operations.

(3) Virtual scene: It is a virtual scene displayed (or provided) when an application program is run on a terminal. The virtual scene can be a simulated environment of a real world, a semi-simulated and semi-fictional virtual environment, or a purely fictional virtual environment. The virtual scene can be any one of a two-dimensional virtual scene, a 2.5-dimensional virtual scene or a three-dimensional virtual scene, and the embodiments of this disclosure do not limit a dimension of a virtual scene. For example, a virtual scene may include a sky, a land, an ocean, and the like. The land includes environmental elements such as a desert and a city. A user can control a virtual player (also referred to as player in some examples) to move in the virtual scene. In some embodiments, the virtual scene may be a game, such as multiplayer online battle arena (MOBA).

(4) Virtual party: A party composed of a plurality of (at least two) virtual players exists in a virtual scene. For example, when the virtual scene is a game, the virtual party may be a game guild or a guild party. It is noted that a virtual party is also referred to as a team in the present disclosure.

Figure 1B:
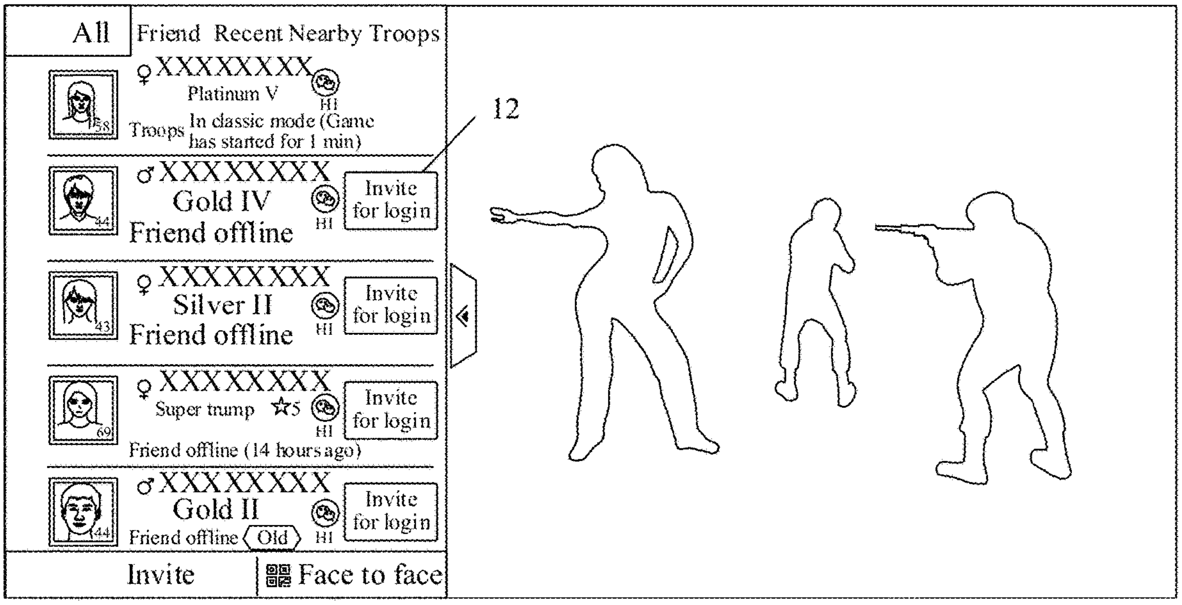
Figure 1C:
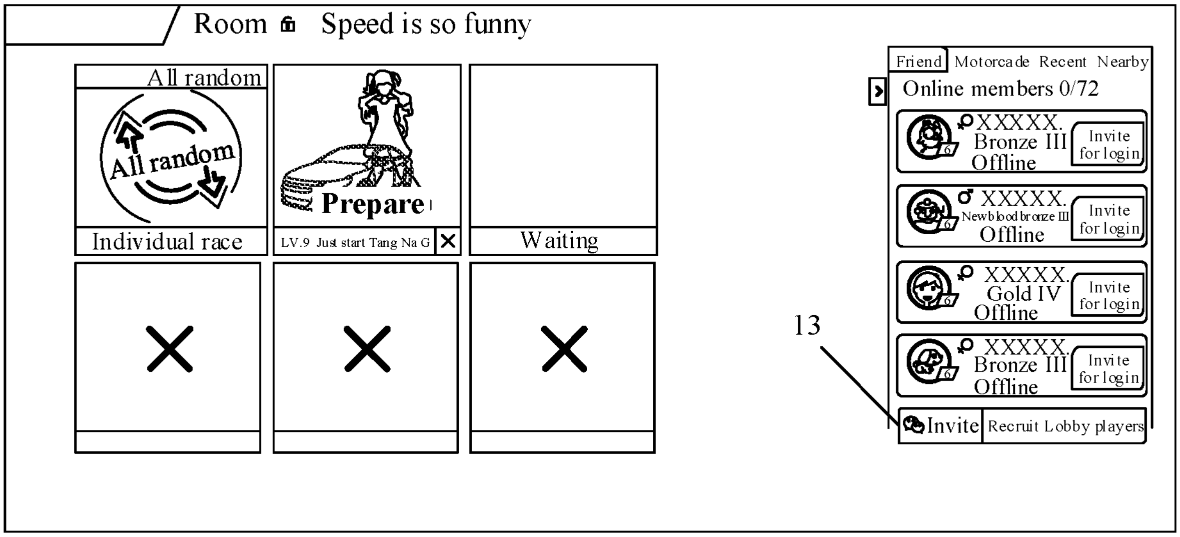

In the related technology, team formation in virtual scenes is real-time. As shown in FIG. 1A to FIG. 1C, FIG. 1A to FIG. 1C are schematic diagrams of an interface of team formation in a virtual scene. A user may invite online users to form teams in real time through an invitation control 11 in FIG. 1A, or invite offline users to log in to form teams in real time through an invitation control 12 in FIG. 1B, or transmit, based on an invitation control 13 in FIG. 1C, a structural message to users through a social platform other than the virtual scene to invite the user to log in to form teams, so that the user may not achieve appointed formation of a team. When the user intends to form a team at a future time point, the user needs to repeatedly chat with many users through a chat function or social communication software of the virtual scene to make an appointment on the time point. At the appointed time point, all the users making the appointment are in online states to form the team. The flow is complex, and the reservation team formation efficiency and the human-computer interaction efficiency are low. Furthermore, at the appointed time pint, if a user cannot log in, the team will not be formed, so that the success rate of appointed team formation is low.

Based on this, the embodiments of this disclosure provide a team formation appointment system in a virtual scene, a team formation appointment method and apparatus in a virtual scene, an electronic device, a computer-readable storage medium, and a computer program product, and can achieve appointed team formation in the virtual scene and improve the human-computer interaction efficiency. These will be explained below.

Figure 2:
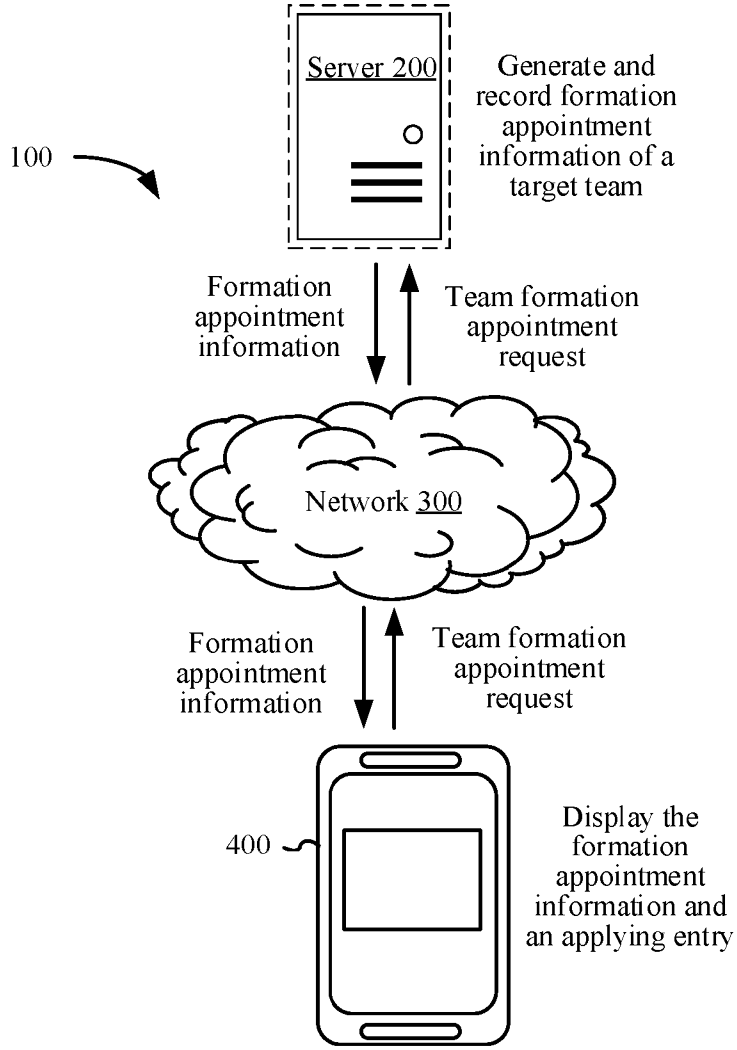
FIG. 2 is a schematic diagram of an architecture of a team formation appointment system 100 in a virtual scene according to an embodiment of this disclosure.

Based on the explanations of the nouns and terms involved in the embodiments of this disclosure, the team formation appointment system in the virtual scene according to an embodiment of this disclosure will be explained first. Referring to FIG. 2, FIG. 2 is a schematic diagram of an architecture of a team formation appointment system 100 in a virtual scene according to an embodiment of this disclosure. To support an exemplary disclosure, a terminal 400 is connected to a server 200 through a network 300. The network 300 may be a wide area network, a local area network, or a combination of the wide area network and the local area network. Data transmission is achieved through a wireless or wired link.

The terminal 400 is configured to: display a team formation appointment control of a first player, the team formation appointment control being configured for making an appointment on forming a target team including the first player; determine a set attribute as a team attribute of the target team based on the team formation appointment control in response to a team attribute setting operation, the team attribute at least including appointed formation time of the target team; and transmit, in response to an appointment confirm instruction triggered based on the set team attribute, a team formation appointment request carrying the team attribute to the server 200.

The server 200 is configured to: receive the team formation appointment request transmitted by the terminal 400, create a target team based on the team attribute of the target team in response to the team formation appointment request, record formation appointment information of the target team, and return formation appointment information to the terminal 400.

The terminal 400 is further configured to: display, after receiving the formation appointment information, the formation appointment information and an applying control configured for applying to join the target team.

In some embodiments, the team formation appointment method in the virtual scene according to an embodiment of this disclosure may be implemented by various electronic devices or computer devices. For example, the method may be separately implemented by a terminal or a server, or may be collaboratively performed by a terminal and a server. The embodiments of this disclosure may be applied to various scenarios, including but not limited to a cloud technology, artificial intelligence, intelligent transportation, assisted driving, game application, and the like.

In some embodiments, the electronic device that implements the team formation appointment method in the virtual scene according to an embodiment of this disclosure may be various types of terminal devices or servers. The server (for example, the server 200) may be an independent physical server, or may be a server cluster or a distributed system formed by a plurality of physical servers, or may be a cloud server that provides basic cloud computing services such as cloud services, cloud databases, cloud computing, cloud functions, cloud storage, network services, cloud communication, middleware services, domain name services, security services, Content Delivery Networks (CDNs), big data, and artificial intelligence platforms. The terminal (for example, the terminal 400) may be a smartphone, a tablet computer, a notebook computer, a desktop computer, a smart speaker (for example, a smart speaker), a smart appliance (for example, a smart TV), a smart watch, an in-vehicle terminal, or the like, but is not limited thereto. The terminal and the server may be directly or indirectly connected in a wired or wireless communication mode. The embodiments of this disclosure do not limit this.

In some embodiments, the terminal or server may implement the team formation appointment method in the virtual scene according to an embodiment of this disclosure by running a computer program. For example, the computer program may be a native program or software module in an operating system. The computer program may be a native application (APP), which can only be run after being installed in the operating system. The computer program may alternatively be a mini program, which can be run after being simply downloaded to a browser environment. The computer program may alternatively be a mini program that can be embedded into any APP. In summary, the above computer program can be any form of application program, module, or plug-in.

Figure 3A:
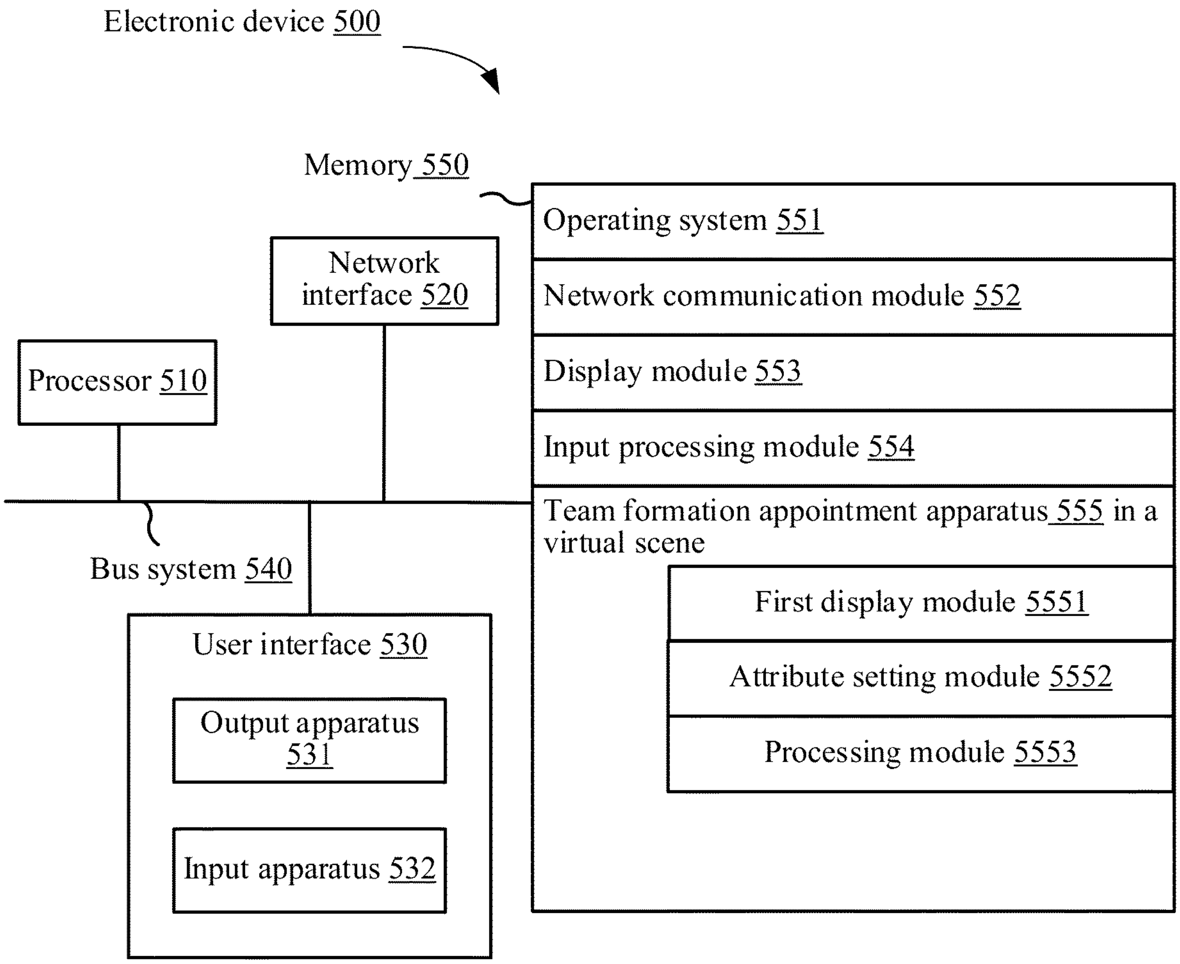
FIG. 3A to FIG. 3B are schematic structural diagrams of an electronic device 500 for implementing a team formation appointment method in a virtual scene according to an embodiment of this disclosure.

An electronic device for implementing a team formation appointment method in a virtual scene according to an embodiment of this disclosure will be explained below. FIG. 3A is a schematic structural diagram of an electronic device 500 for implementing a team formation appointment method in a virtual scene according to an embodiment of this disclosure. The electronic device 500 being the terminal shown in FIG. 2 is taken as an example. The electronic device 500 according to an embodiment of this disclosure includes:

at least one processor 510, a memory 550, at least one network interface 520, and a user interface 530. The various components in the electronic device 500 are coupled together by using a bus system 540. The bus system 540 is configured to implement connection and communication between the components. In addition to a data bus, the bus system 540 further includes a power bus, a control bus, and a state signal bus. But, for case of clear description, all types of buses in FIG. 3A are marked as the bus system 540.

The processor 510 may be an integrated circuit chip having a signal processing capability, such as a general purpose processor, a Digital Signal Processor (DSP), or other programmable logic devices, a discrete gate or transistor logic device, and a discrete hardware assembly. The general purpose processor may be a microprocessor or any processor, and the like.

The user interface 530 includes one or more output apparatuses 531 capable of displaying media content, including one or more speakers and/or one or more visual display screens. The user interface 530 further includes one or more input apparatuses 532, including a user interface component helpful to typing, such as a keyboard, a mouse, a microphone, a touch display screen, a camera, other input buttons, and a control.

The memory 550 may be a removable memory, an unremovable memory, or a combination of both a removable memory and an unremovable memory. An exemplary hardware device includes a solid-state memory, a hard disk drive, an optical disk drive, and the like. The memory 550 alternatively includes one or more storage devices away from the processor 510 in physical positions.

The memory 550 may be a volatile memory or a non-volatile memory, or may include both a volatile memory and a non-volatile memory. For example, the non-volatile memory may be a read only memory (ROM), and the volatile memory may be a random access memory (RAM). The memory 550 described in this embodiment of this disclosure aims to include any other suitable type of memories.

In some embodiments, the memory 550 may store data to support various operations. Examples of the data include a program, a module, and a data structure or other subsets or supersets, which are exemplified below.

An operating system 551 includes a system program configured to process various basic system services and performing hardware-related tasks, for example, a framework layer, a core library layer, a drive layer, and the like, to implement various basic services and process hardware-based tasks.

A network communication module 552 is configured to reach other computing devices via one or more (wired or wireless) network interfaces 520. Exemplarily, the network interfaces 520 include: Bluetooth, Wi-Fi, Universal Serial Bus (USB), and the like.

A display module 553 is configured to display information via the one or more output apparatuses 531 (for example, a display screen and speaker) associated with the user interface 530 (for example, a user interface configured for operating peripheral devices and displaying content and information).

An input processing module 554 is configured to detect a user input or interaction from the input apparatus 532 and translate the detected input or interaction.

In some embodiments, a team formation appointment apparatus in a virtual scene according to an embodiment of this disclosure may be implemented in software. FIG. 3A shows a team formation appointment apparatus 555 in a virtual scene stored in the memory 550, which may be software in the form of a program and a plug-in, including the following software modules: a first display module 5551, an attribute setting module 5552, and a processing module 5553. These modules are logic, so that any combination or division can be performed according to the functions realized, and the functions of the various modules will be described below.

Figure 3B:
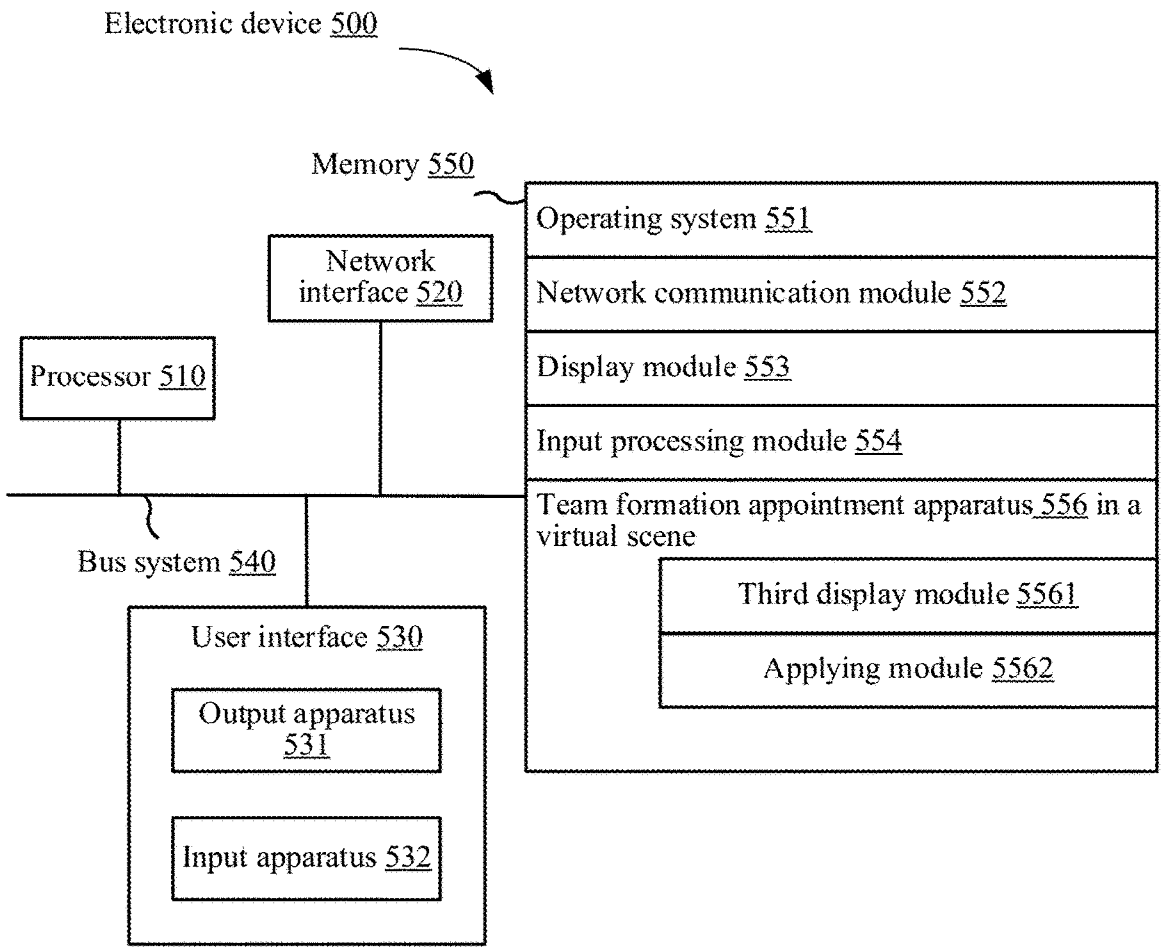

In some embodiments, another team formation appointment apparatus in a virtual scene according to an embodiment of this disclosure may alternatively be implemented in software. FIG. 3B shows a team formation appointment apparatus 556 stored in the memory 550, which may be software in the form of a program and a plug-in, including the following software modules: a third display module 5561 and an applying module 5562. These modules are logic, so that any combination or division can be performed according to the functions realized. The functions of all the modules will be explained below.

In some other embodiments, the team formation appointment apparatus 555 in the virtual scene and the team formation appointment apparatus 556 in the virtual scene according to an embodiment of this disclosure may be implemented in hardware. As an example, the team formation appointment apparatus in the virtual scene according to an embodiment of this disclosure may be a processor in the form of a hardware decoding processor, and is programmed to implement the team formation appointment method in the virtual scene according to an embodiment of this disclosure. For example, the processor in the form of a hardware decoding processor may use one or more application-specific integrated circuits (ASICs), a digital signal processor (DSP), a programmable logic device (PLD), a complex programmable logic device (CPLD), a field-programmable gate array (FPGA), or other electronic elements.

The team formation appointment method in the virtual scene according to an embodiment of this disclosure will be explained below based on the explanations of the team formation appointment system in the virtual scene and the electronic device according to an embodiment of this disclosure. In some embodiments, the team formation appointment method in the virtual scene according to an embodiment of this disclosure may be implemented separately by a server or a terminal, or jointly implemented by a server and a terminal. The following takes terminal implementation as an example to explain a team formation appointment method in a virtual scene.

Figure 4:
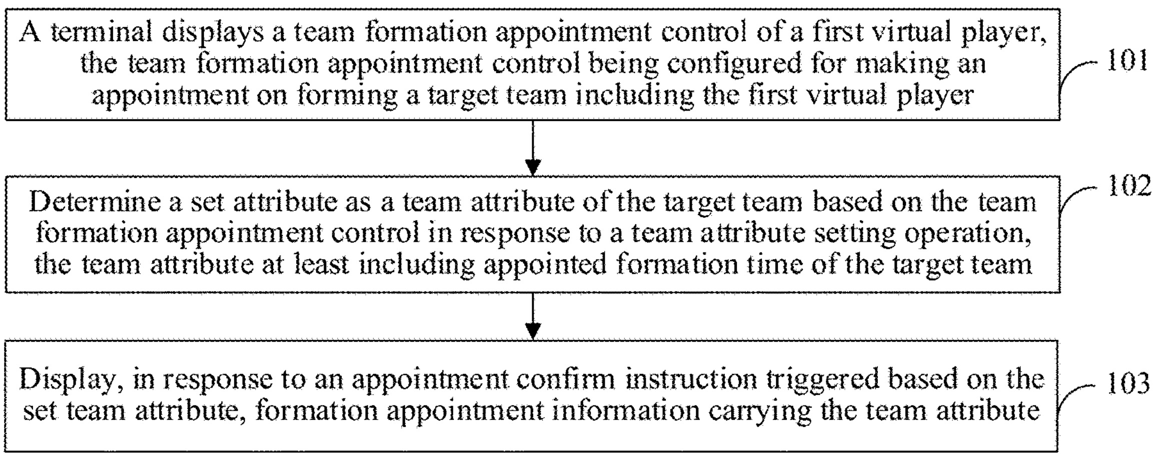
FIG. 4 is a flowchart of a team formation appointment method in a virtual scene according to an embodiment of this disclosure.

FIG. 4 is a flowchart of a team formation appointment method in a virtual scene according to an embodiment of this disclosure. The team formation appointment method in the virtual scene according to an embodiment of this disclosure includes:

Operation 101: A terminal displays a team formation appointment control of a first player, the team formation appointment control being configured for making an appointment on forming a target team including the first player.

In practical applications, a client (such as a game client) that supports the virtual scene or a client (such as an instant messaging client, a livestreaming client, and a team formation client) integrated with a virtual scene function is installed on the terminal. When a user (the first player) opens the client on the terminal and the terminal runs the client, the user may interact with a virtual player based on a picture of the virtual scene displayed by the client. For example, when the client is the game client, the user may interact (such as perform virtual battle) with a game character in a game scene based on a game picture displayed by the game client.

In practical applications, the client integrates a team formation appointment function in the virtual scene. This function may be achieved through a team formation appointment function control (a team formation appointment control). A current operating player of the client is used as the first player. In some embodiments, the terminal displays an interface of the virtual scene after running the client of the first player. The team formation appointment control of the first player may be displayed in the interface of the virtual scene. The team formation appointment control is configured for making an appointment on forming a target team including the first player.

The formation appointment mentioned in the embodiments of this disclosure means formation at an appointed formation time which is after current time (a triggering moment of the team formation appointment control or a current date) and has a target duration from the current time. To be specific, the appointed formation time of the target team is a specific time point that is set by the user in advance and is after the current time. The appointed formation time or the target duration may be set according to an actual need. In some embodiments, the appointed formation time may be a time point. For example, if the current time is June 4, the appointed formation time of the target team may be 10:00 on June 8. In some other embodiments, the appointed formation time may be a time period. The time period may represent both the appointed formation time of the target team and battle interaction time. For example, if the current time is June 4, the appointed formation time of the target team may be from 10:00 to 11:00 on June 8. To be specific, the target team is formed at 10:00 on June 8. A duration of the target team is 10:00 to 11:00. Within this time period, battle interaction in the virtual scene may be performed based on the formed target team.

In practical applications, the virtual scene may include at least two virtual parties. Each virtual party includes at least two virtual players. Different virtual parties may have hostile relationships. In some embodiments, the terminal displays a virtual party control in the interface of the virtual scene of the first player, and displays, in response to a triggering operation on the virtual party control, a virtual party interface corresponding to a virtual party. The first player belongs to the virtual party. The team formation appointment control is displayed in the virtual party interface.

Figure 5:
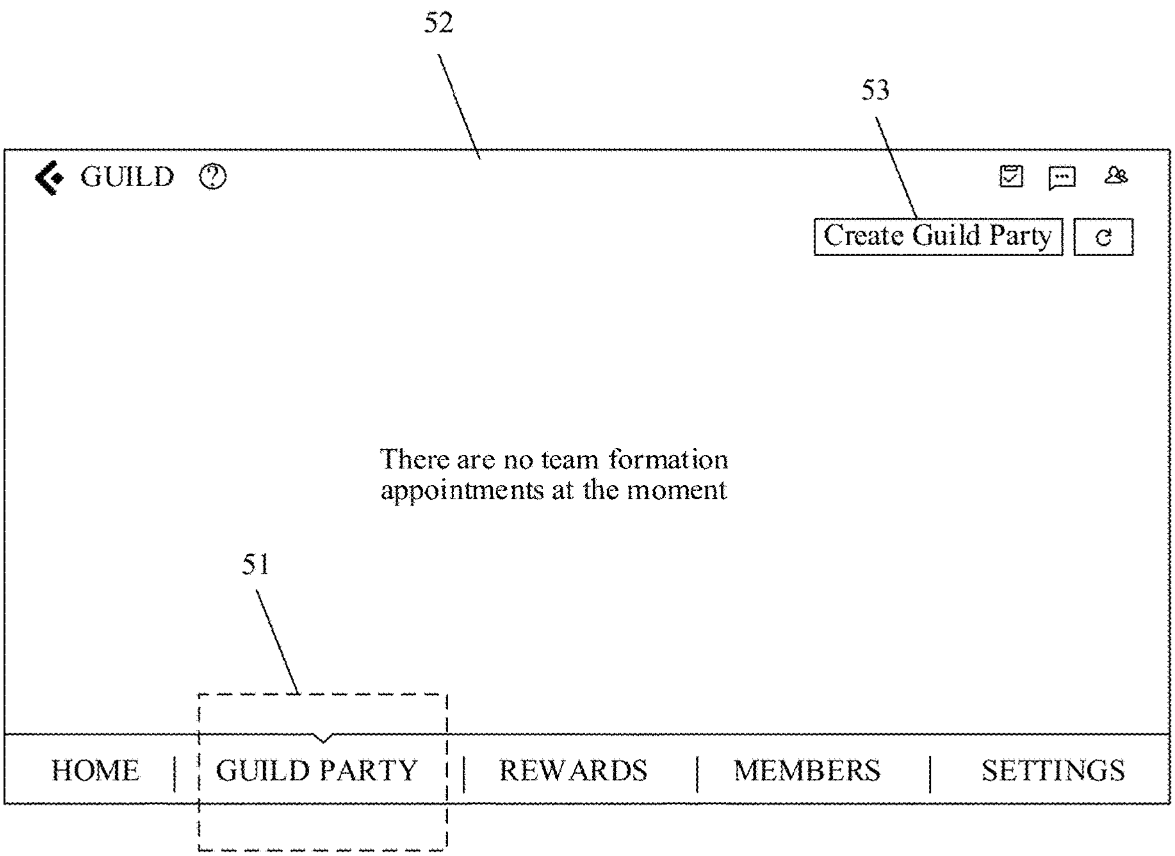
FIG. 5 is a schematic diagram of a presentation interface of a team formation appointment control according to an embodiment of this disclosure.

Exemplarily, the client being the game client is taken as an example. The virtual party is a GUILD PARTY. FIG. 5 is a schematic diagram of a presentation interface of a team formation appointment control according to an embodiment of this disclosure. In FIG. 5, when a user clicks on a virtual party control 51 (i.e. a GUILD PARTY button), the game client displays a virtual party interface 52 corresponding to the virtual party in response to the click operation, and displays a team formation appointment control 53 (i.e. a Create GUILD PARTY button) in the virtual party interface 52. The team formation appointment control 53 is configured for making an appointment on forming a target team including a first player.

Operation 102: Determine a set attribute as a team attribute of the target team based on the team formation appointment control in response to a team attribute setting operation, the team attribute at least including appointed formation time of the target team.

In practical applications, when the first player wants to make an appointment to form the target team through the team formation appointment control, the team attribute of the target team needs to be set first. The setting of the team attribute will be explained.

In practical applications, when the first player triggers the team formation appointment control, the terminal may display an attribute setting interface, and the attribute setting interface allows the first player to set the team attribute of the target team. For example, when the user triggers a team formation appointment function, to be specific, after the user triggers the team formation appointment control, such as performing a single-click operation, a double-click operation, a long-press operation, and the like on the team formation appointment control, the terminal displays the attribute setting interface configured for performing attribute setting on the target team. The terminal may receive, through the displayed attribute setting interface, the setting performed by the first player on the team attribute of the target team.

In practical applications, the team attribute includes the appointed formation time. As it is appointed formation of a team, the user needs to set (or schedule) the appointed formation time. In some embodiments, in addition to the appointed formation time, the user may alternatively set at least one of the following team attributes for the target team based on the displayed attribute setting interface: a team interaction mode, the number of team members, the number of players applying to join the target team (also referred to as target party in some examples), ranks of players applying to join the target team, and a party tag.

In some embodiments, the attribute setting interface includes an attribute function item corresponding to each team attribute, such as a time function item configured for setting the appointed formation time, a Team Mode function item configured for setting an interaction mode of the target team, a Party size function item configured for setting the number of members in the target team, a Member num function item configured for setting the number of players applying to join the target team (also referred to as the number of applicants to join the target team), a Ranked Requirements function item configured for setting ranks of players applying to join the target team (also referred to as ranks of applicants to join the target team), and a Party Tag function item configured for setting a party tag of the target team.

Based on the attribute setting interface, the terminal receives a team attribute setting operation configured for performing team attribute setting. The team attribute setting operation includes a first setting operation configured for setting the appointed formation time and a second setting operation configured for setting another team attribute besides the appointed formation time. In some embodiments, the terminal receives, based on the time function item, the first setting operation performed on the appointed formation time based on the time function item, and receives, based on the attribute function item, the second setting operation performed on the team attribute.

Figure 6:
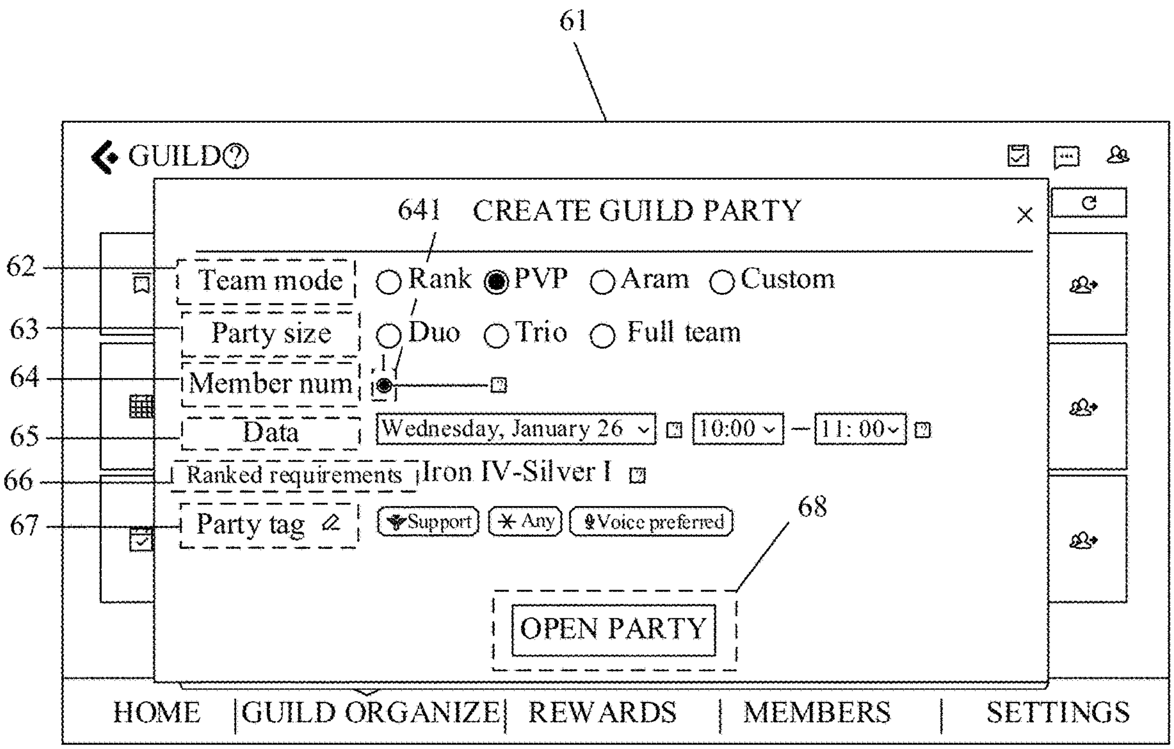
FIG. 6 is a schematic diagram of an attribute setting interface according to an embodiment of this disclosure.

The client being the game client is continued to be taken as an example. FIG. 6 is a schematic diagram of an attribute setting interface according to an embodiment of this disclosure. In conjunction with FIG. 5, when the user clicks on the team formation appointment control 53 in FIG. 5, an attribute setting interface 61 shown in FIG. 6 is displayed. A Team Mode function item 62 (i.e. TEAM MODE) is displayed in the attribute setting interface 61. FIG. 6 exemplifies four interaction mode options for the user to set a game mode, namely a ranking mode (i.e. Rank), a matching mode (i.e. PvP), a customization mode (i.e. Custom), and other mode (i.e. Other). The user may select the interaction mode according to an actual need. A Party size function item 63 (i.e. Party size) is displayed in the attribute setting interface 61, so that the user sets the number of team members. FIG. 6 exemplifies three number-of-team-member options: Duo, Trio, and Full team. The user may select the number of team members according to an actual need. A Member num function item 64 (i.e. Member num) is further displayed in the attribute setting interface 61. The user may set, through a number indicator 641, the number of players applying to join the target team. A time function item 65 is further displayed in the attribute setting interface 61. The user may set the appointed formation time of the target team. A Ranked Requirements function item 66 (i.e. Ranked Requirements) is further displayed in the attribute setting interface 61. The user may set the ranks of players applying to join the target team. A Party Tag function item 67 (i.e. Party Tag) is further displayed in the attribute setting interface 61. The user may set a party tag of the target team.

Figure 7A:
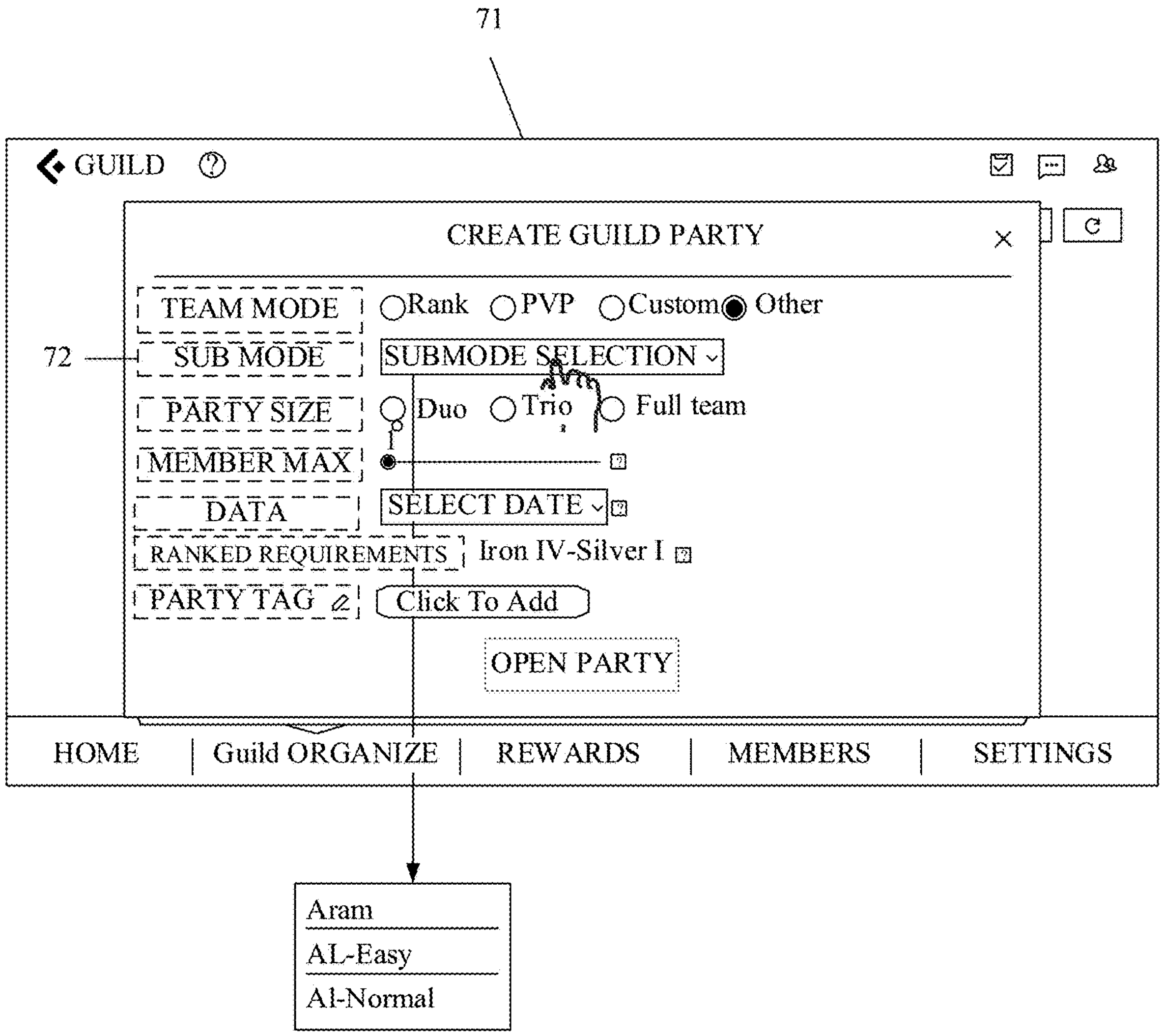
FIG. 7A and FIG. 7B are schematic diagrams of a sub interaction mode setting interface according to an embodiment of this disclosure.
Figure 7B:
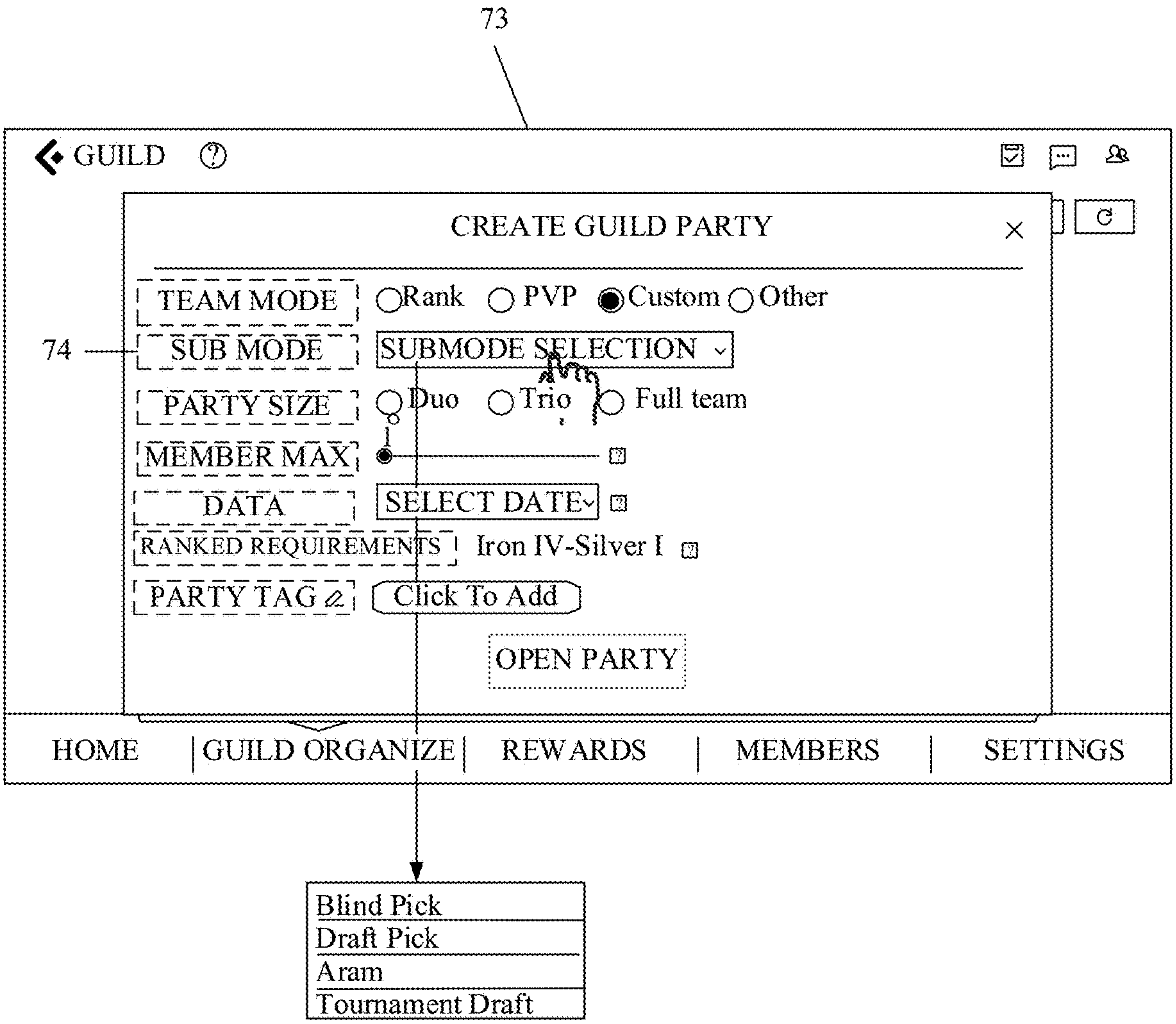

In some embodiments, the team attribute further includes a sub interaction mode. Correspondingly, a sub mode function item may alternatively be displayed in the attribute setting interface. The sub interaction mode of the target team may be set based on the sub mode function item. FIG. 7A and FIG. 7B are schematic diagrams of a sub interaction mode setting interface according to an embodiment of this disclosure. Referring to FIG. 7A, in an attribute setting interface 71, when a user selects the Other mode in the interaction mode option, a SUB MODE function item 72 is in a selectable state. When the user clicks on a sub interaction mode option, a sub interaction mode option list is displayed. FIG. 7A exemplifies three sub interaction modes, including Aram, Al-Easy, and Al-Normal, and the user may click to select a sub interaction mode. Referring to FIG. 7B, in an attribute setting interface 73, when a user selects the customization mode in the interaction mode option, the SUB MODE function item 74 is in a selectable state. When the user clicks on the sub interaction mode option, a sub interaction mode option list is displayed. FIG. 7B exemplifies four sub interaction modes, including Blind Pick, Draft Pick, Aram, and Tournament Draft. When the user selects the ranking mode or the matching mode in the interaction mode option, the SUB MODE function item is in a non-selectable state.

In practical applications, the user needs to set a tag of a team formed. Therefore, when the team appointed to be formed carries the corresponding party tag, the party tag may indicate the characteristics of the team, so that the efficiency of other users joining the team appointed to be formed is improved, and the success rate of final formation of the team appointed to be formed is increased. In some embodiments, when the team attribute include a party tag and the attribute setting interface displays a tag function item configured for setting the party tag, the user may set the party tag by the following mode: The terminal displays, in response to a triggering operation performed on the tag function item, a tag selection interface that includes at least two party tags; and the terminal determines, in response to a selection operation performed on a target party tag of the at least two party tags, the target party tag as the party tag of the target team.

Figure 8A:
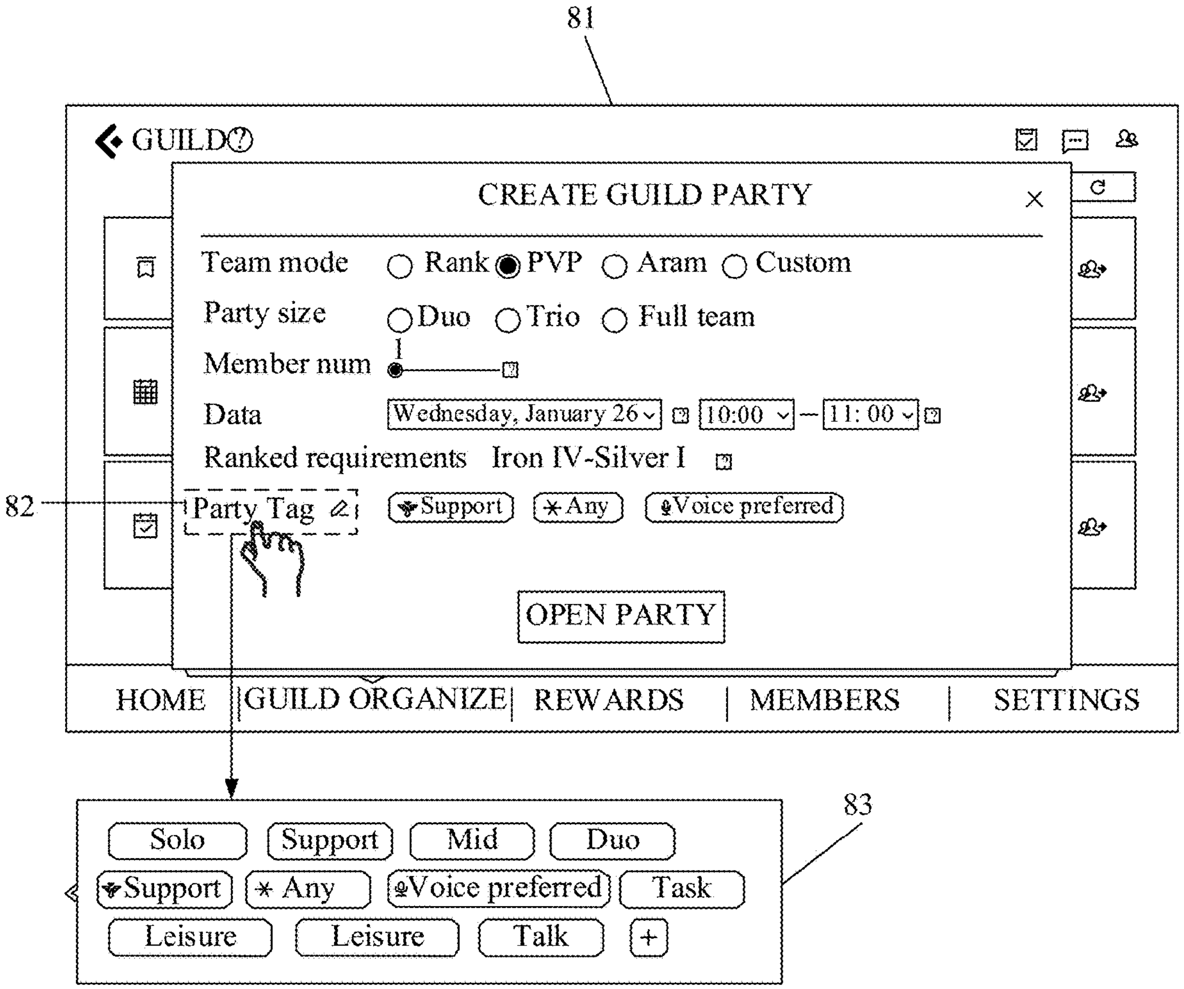
FIG. 8A and FIG. 8B are schematic diagrams of a party tag setting interface according to an embodiment of this disclosure.
Figure 8B:
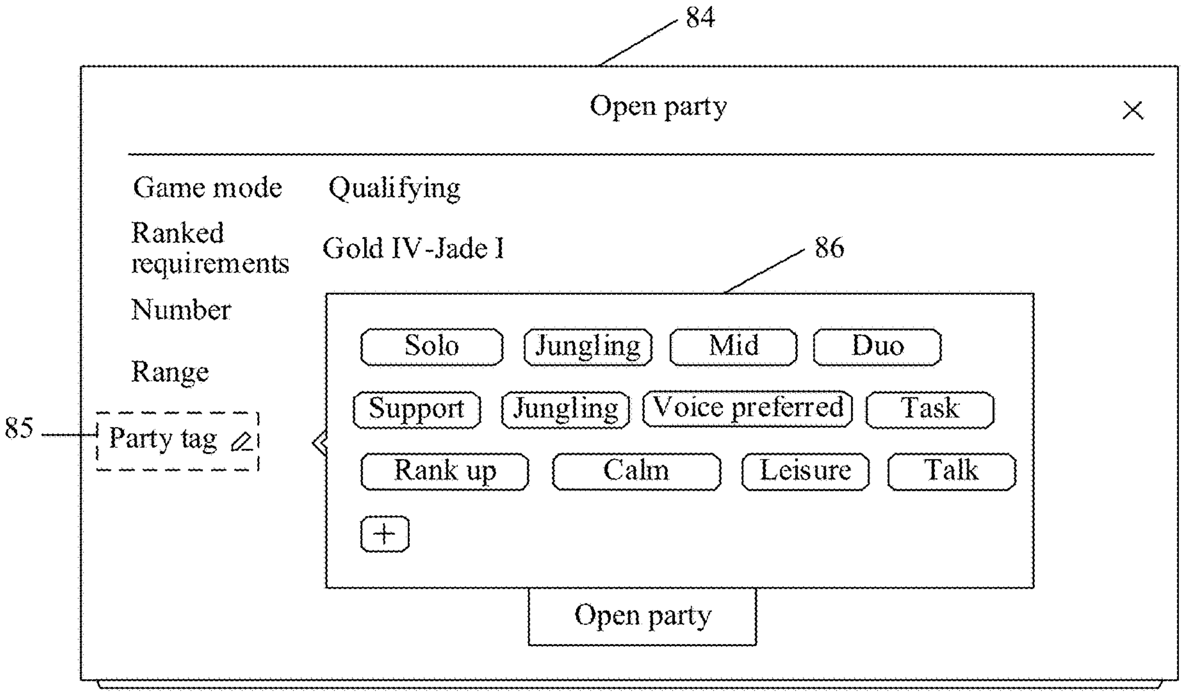

Exemplarily, FIG. 8A and FIG. 8B are schematic diagrams of a party tag setting interface according to an embodiment of this disclosure. Referring to FIG. 8A, in an attribute setting interface 81, when a user triggers a tag function item 82 configured for setting a party tag, a tag option interface 83 is displayed, and the tag option interface 83 displays party tag options available for selection, and the user may select a party tag. Continuing to refer to FIG. 8B, in the attribute setting interface 84, when the user clicks on the tag function item 85 configured for setting a party tag, a tag option interface 86 is displayed, and the tag option interface 86 displays party tag options available for selection, and the user may select a party tag.

Figure 9:
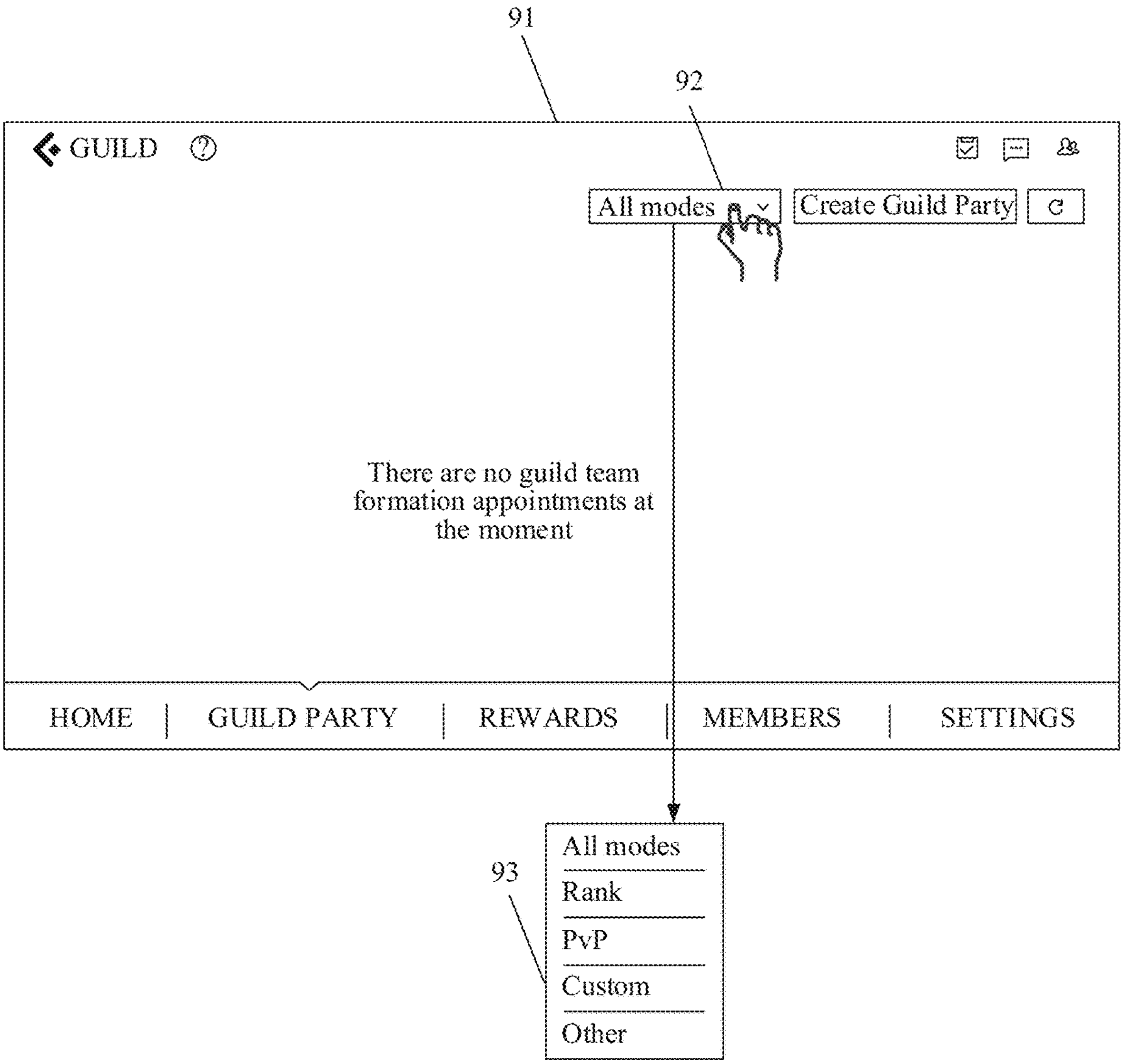
FIG. 9 is a schematic diagram of a team interaction mode setting interface according to an embodiment of this disclosure.

In some embodiments, the user may set the interaction mode of the target team based on the team mode function item in the attribute setting interface, and also set the team interaction mode based on the team mode function item displayed in the virtual party interface before the team formation appointment control is triggered. FIG. 9 is a schematic diagram of a team interaction mode setting interface according to an embodiment of this disclosure. Referring to FIG. 9, in a virtual party interface 91, a team mode function item 92 is displayed. When a user triggers the team mode function item 92, a team mode interface 93 is displayed, and a plurality of (at least two) team interaction modes available for selection by the user are displayed in the team mode interface 93.

In practical applications, as the target team needs to be formed at the appointed formation time that is set by the user and is after the current time point, the appointed formation time is a necessary team attribute. In practical applications, the team attribute setting operation includes the first setting operation configured for setting the appointed formation time and the second setting operation configured for setting other team attributes besides the appointed formation time. When the user triggers the team attribute setting operation based on the attribute setting interface, the terminal determines the set attribute as the team attribute of the target team.

Operation 103: Display, in response to an appointment confirm instruction triggered based on the set team attribute, formation appointment information carrying the team attribute.

The formation appointment information is configured for indicating formation of the target team including the first player at the appointed formation time and configured for allowing a second player (or candidate team player) to apply to join the target team based on the formation appointment information.

An appointment confirm control may be displayed in the attribute setting interface. After the user triggers the team attribute setting operation based on the attribute setting interface, the appointment confirm instruction may be triggered through the appointment confirm control. Referring to FIG. 6, an appointment confirm control 68 (i.e. an OPEN PARTY button) is shown in the attribute setting interface 61 of FIG. 6. When the user clicks on the OPEN PARTY button, the appointment confirm instruction is triggered.

In practical applications, when the terminal receives, in the attribute setting interface, the team attribute that is set by the user for the target team, the terminal may transmit a team formation appointment request carrying the team attribute to a server (such as the server 200 shown in FIG. 2). The server creates the target team based on the team attribute of the target team in response to the team formation appointment request. The created target team is an empty team. The server records the formation appointment information of the target team, and returns the formation appointment information to the terminal. The formation appointment information may include the team attribute set by the user, such as the team interaction mode, the number of team members, the party tag, the appointed formation time, and a founder (i.e. the first player) of the team.

Figure 10:
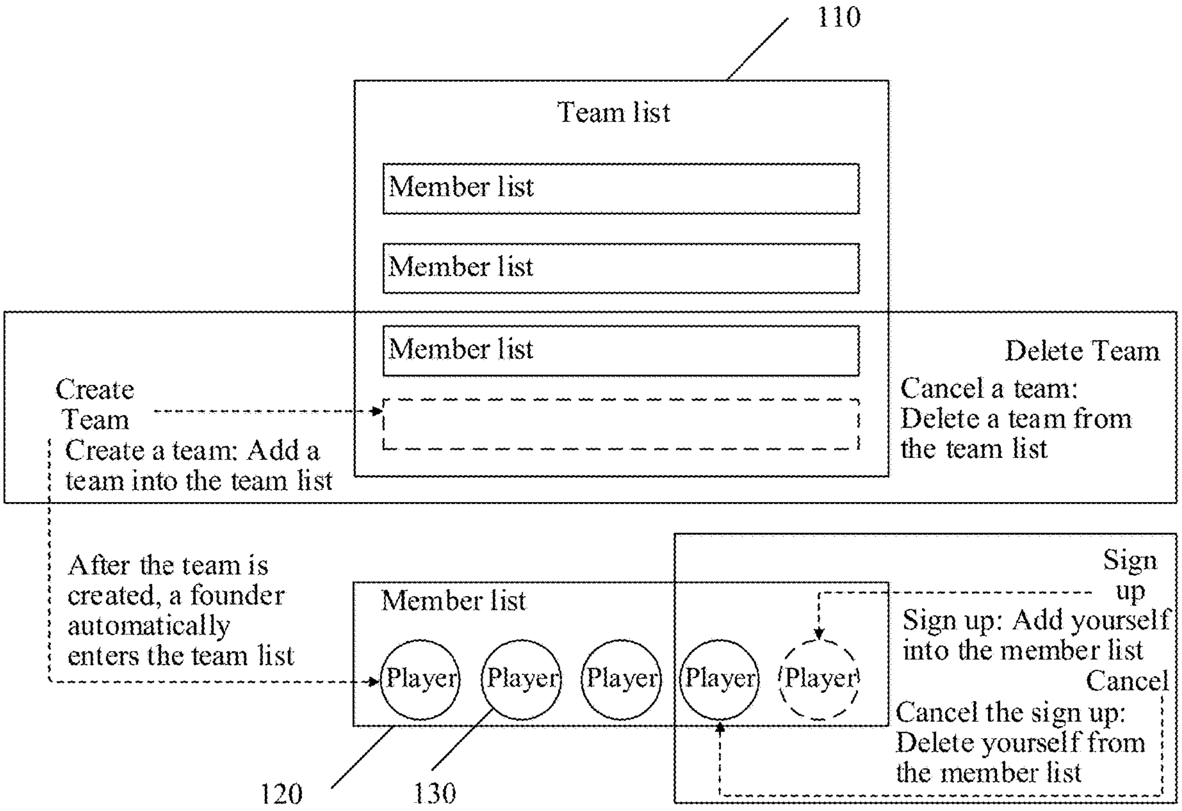
FIG. 10 is a schematic diagram of a team list according to an embodiment of this disclosure.

In actual implementation, a team list is stored in the server. FIG. 10 is a schematic diagram of a team list according to an embodiment of this disclosure. Referring to FIG. 10, the team list (i.e. Team List) 110 is configured for recording a Member List 120 of formation appointment of various terminal. In some embodiments, Member Lists in a team list may be recorded according to orders of the appointed formation time of teams. When the user triggers a deletion instruction for the target team, the server deletes the corresponding Member List from the team list. The Member List may include player information 130 who signs up (i.e. applies for) to join the target team. In some embodiments, Players in a Member List may be recorded according to their orders of applying to join a team. The founder (the first player) of the target team is the first player applying to join the team by default. The founder cannot cancel signing up, but can delete the team appointed to be formed. Other virtual players applying to join the target team may cancel signing up. When a player applying to join the team triggers cancellation of the application to the target team or cancellation of the sign up to the target team, the server deletes the corresponding player information from the Member List of the target team. To be specific, the team list in the server may be updated in real time according to operations of a front-end user, and updated information may be synchronized to a front-end.

In some embodiments, after receiving a team formation appointment request transmitted by the terminal of the first player, before creating the target team, the server needs to determine whether a login account of the terminal has a permission to make an appointment to create the target team. When determining that the login account has the permission to make an appointment to create the target team, the server creates the target team and updates the team list.

In practical applications, the server may determine, by the following mode, whether the login account (i.e. the first player) of the terminal has a permission to make an appointment to create the target team: The server obtains the number of teams appointed to be formed by the first player within a target time period, and determines, when the number is less than a number threshold, that the first player has the permission to make an appointment to create the target team; and displays formation prompt information when the number is greater than the number threshold, the formation prompt information being configured for prompting that the number of the teams formed by the first player has reached an upper limit. The target time period and the number threshold may be set according to an actual need. For example, if the target time period is one day or one week, the number threshold is 1 or 3.

In practical applications, login accounts of different users may have corresponding ranks. Correspondingly, the server may alternatively determine, through the following mode, whether the login account (i.e. the first player) of the terminal has the permission to make an appointment to create the target team: The server obtains a rank of the first player, and determines, when the rank of the first player reaches a target rank (which may be set according to an actual need), that the first player has the permission to make an appointment to create the target team. For example, the login accounts corresponding to the virtual scene are divided into 6 ranks. When the rank of the first player is at rank 3 or above, it is determined that the first player has the permission to make an appointment to create the target team.

In practical applications, except for the terminal of the founder of the target team, another user terminal (a terminal of a second player) may receive the formation appointment information transmitted by the server, display the formation appointment information carrying the team attribute, apply, based on the formation appointment information, to join the target team, and display applying result prompt information of the second player when the terminal of the second player receives a team applying operation triggered by the second player based on the formation appointment information, the applying result prompt information being configured for prompting a result of applying to join the target team by the second player.

In practical applications, the terminal of the second player may display the formation appointment information through a virtual party interface. In practical applications, the terminal displays the virtual party interface of the second player, a virtual party corresponding to the virtual party interface including the first player and the second player; and displays, in the virtual party interface, the formation appointment information carrying the team attribute of the target team.

When the team attribute includes the number of players applying to join the target team, and the number of players applying to join the target team is a target number (which may be set according to an actual need), the terminal of the second player further displays the target number of player display positions, the player display positions being configured for carrying player identifiers; and displays, in the player display positions, player identifiers of virtual players that have applied to join the target team. To be specific, when a player display position displays a player identifier, it indicates that the player corresponding to the player identifier has applied to join the target team, and the player identifiers and the player display positions have a one-to-one correspondence relationship. Correspondingly, the applying result prompt information of the second player is represented by whether the player identifier of the second player is in the player display position; and when the second player applies to join the target team successfully, and the target number of player display positions include a display vacancy, the player identifier of the second player is displayed in the display vacancy to prompt that the second player applies to join the target team successfully.

Figure 11:
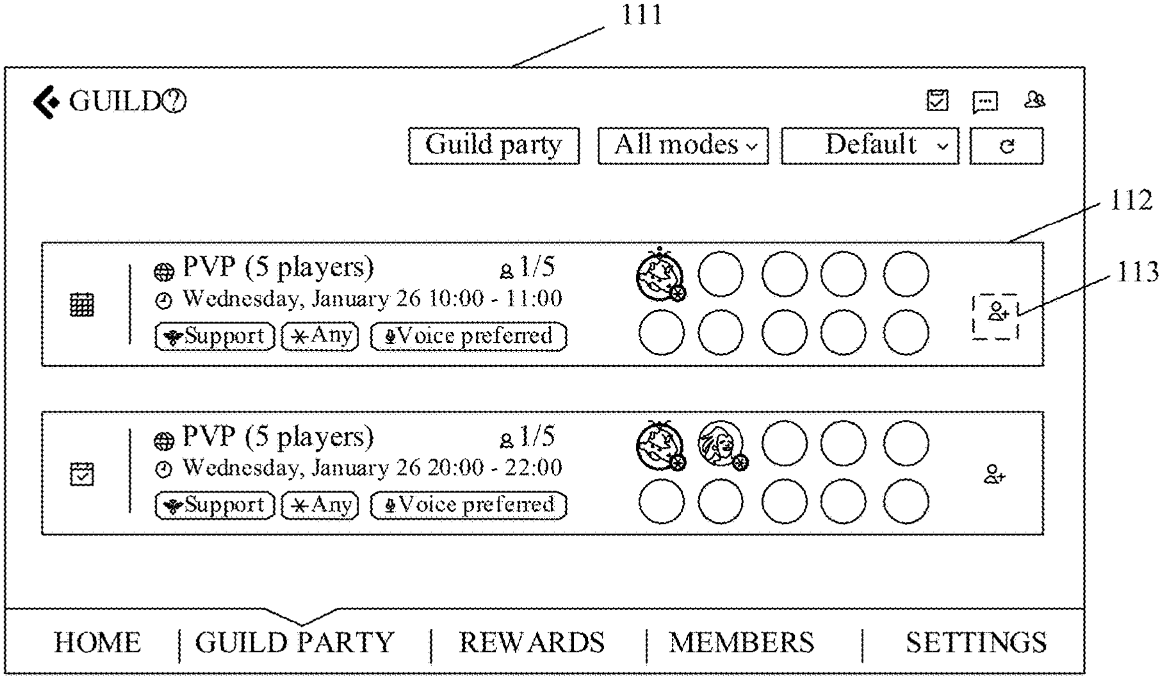
FIG. 11 is a schematic diagram of an applying interface of a target team according to an embodiment of this disclosure.

In some embodiments, when the second player triggers the formation appointment information (such as clicking on the formation appointment information), an applying control configured for applying to join the target team is displayed. When the second player triggers the applying control (such as by single click and double click), an applying instruction (i.e. a sign up instruction) is triggered. In some other embodiments, the terminal of the second player displays the applying control configured for applying to join the target team when displaying the formation appointment information. FIG. 11 is a schematic diagram of an applying interface of a target team according to an embodiment of this disclosure. Formation appointment information corresponding to teams appointed to be formed by various members of the virtual party and corresponding applying controls are displayed in a virtual party interface 111, such as formation appointment information 112 and a corresponding applying control 113 shown in FIG. 11, so that a user may intuitively view information of various pre-formed teams through the virtual party interface 111, and apply to join the corresponding target team according to an own situation and the applying control.

In actual implementation, except that a second player actively applies (signs up) to join a team based on the formation appointment information displayed on a second player end, a founder (a first player) of the target team may invite the second player to join the target team. In some embodiments, the terminal of the first player displays an invitation function item of the target team in an associated region of the formation appointment information. The invitation function item is configured for inviting at least one second player to join the target team. The terminal of the first player displays, when a triggering operation performed on the invitation function item is received, a player invitation interface including at least one second player; and based on the player invitation interface, displays, in response to an invitation operation performed on a target second player, invitation prompt information configured for prompting an invitation result for the target second player.

In some embodiments, the second player and the invitation function item may be in a one-to-one correspondence relationship. To be specific, each second player corresponds to one invitation function item. The terminal displays player identifiers of the various second players in the player invitation interface, and displays a corresponding player invitation function item in an associated region of the player identifiers; and in response to a triggering operation performed on a target player invitation function item corresponding to the target second player, determines the triggering operation, performed on the target player invitation function item, as the invitation operation performed on the target second player.

In some embodiments, the second player and the invitation function item may alternatively have a many-to-one correspondence relationship. To be specific, a plurality of second players correspond to one invitation function item. The terminal displays the player identifiers of the various second players in the player invitation interface; displays an invitation function item based on the displayed player identifiers in response to a selection operation performed on the target second player; and in response to a triggering operation performed on the invitation function item, determines a triggering operation, performed on the invitation function item, as the invitation operation performed on the target second player. There may be one or more (i.e. at least two) target second players.

In practical applications, in such a case that the second player has applied to join another team appointed to be formed and corresponding formation time of the team conflicts with the appointed formation time of the target team, first prompt information configured for prompting a time conflict, when the terminal of the first player displays the player invitation interface, the terminal displays, in the player invitation interface, first prompt information configured for prompting a time conflict.

In practical applications, there is also a situation where the second player is in an invitation unavailable state. For example, if a second player has set No Disturbance by sign up invitation, the second player is in an invitation unavailable state. In this case, when the terminal of the first player displays the player invitation interface, the terminal displays, in the player invitation interface, second prompt information configured for prompting that the second player is in the invitation unavailable state.

Figure 12:
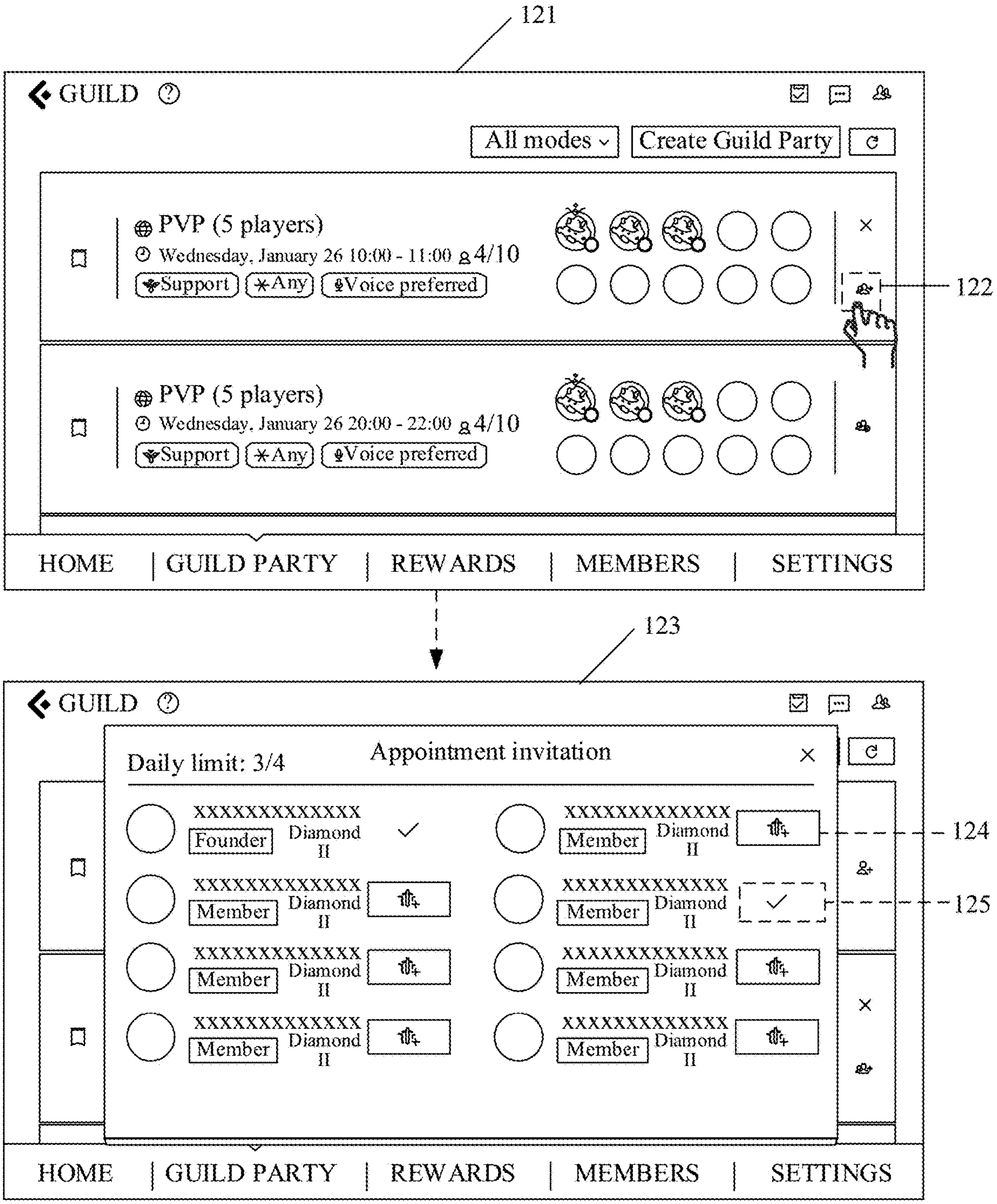
FIG. 12 is a schematic diagram of a presentation interface of an invitation function item according to an embodiment of this disclosure.

For example, FIG. 12 is a schematic diagram of a presentation interface of an invitation function item according to an embodiment of this disclosure. In a virtual party interface 121 shown in FIG. 12, an invitation function item 122 of a target team is displayed in an associated region of formation appointment information. When a first player clicks on the invitation function item 122, the page jumps to a player invitation interface 123. A player identifier of a second player available for invitation is displayed in the player invitation interface, and a corresponding player invitation function item 124 is displayed in an associated region of the player identifier. When the first player clicks on the player invitation function item 124, an invitation instruction for the corresponding second player is triggered. After the first player clicks on the player invitation function item and triggers the invitation instruction for the corresponding second player, the terminal cancels (or stops) the displaying of the clicked player invitation function item and displays an indicator 125 configured for indicating that the corresponding second player has been invited.

Figure 13:
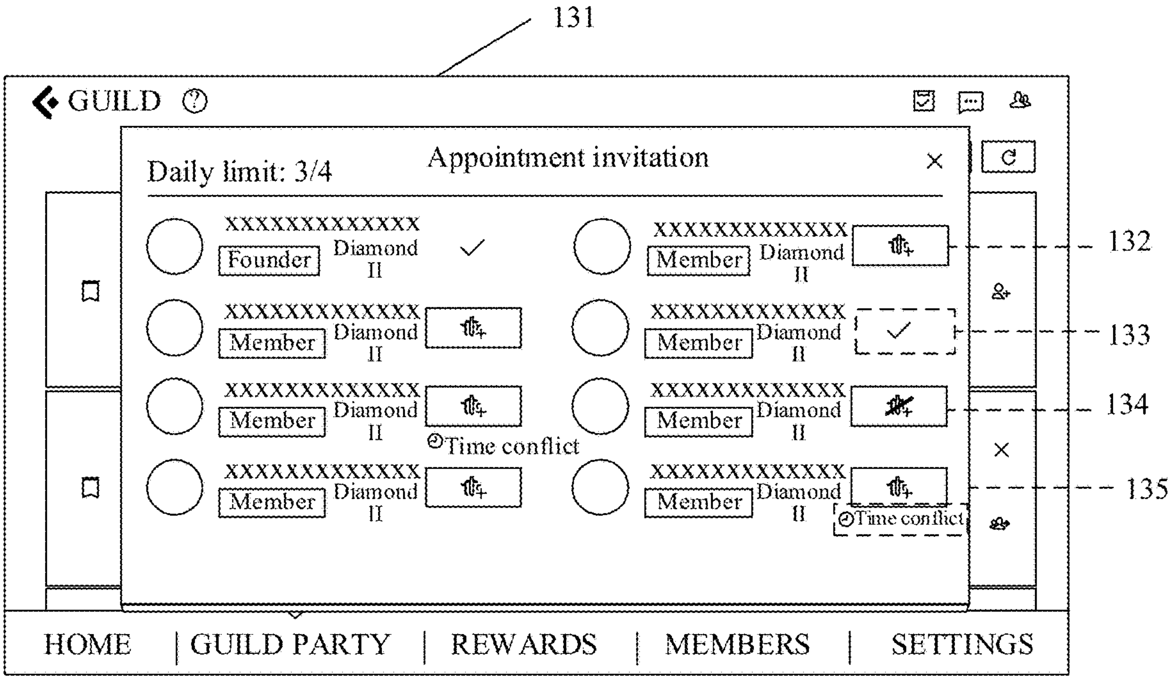
FIG. 13 is a schematic diagram of a player invitation interface according to an embodiment of this disclosure.

FIG. 13 is a schematic diagram of a player invitation interface according to an embodiment of this disclosure. An invitation function item 132 configured for indicating that a corresponding second player may be invited, an indicator identifier 133 configured for indicating that the corresponding second player has been invited, first prompt information 135 configured for indicating a time conflict, and a second prompt information 134 configured for indicating that the second player is in an invitation unavailable state are displayed in a player invitation interface 131 shown in FIG. 13.

Figure 14:
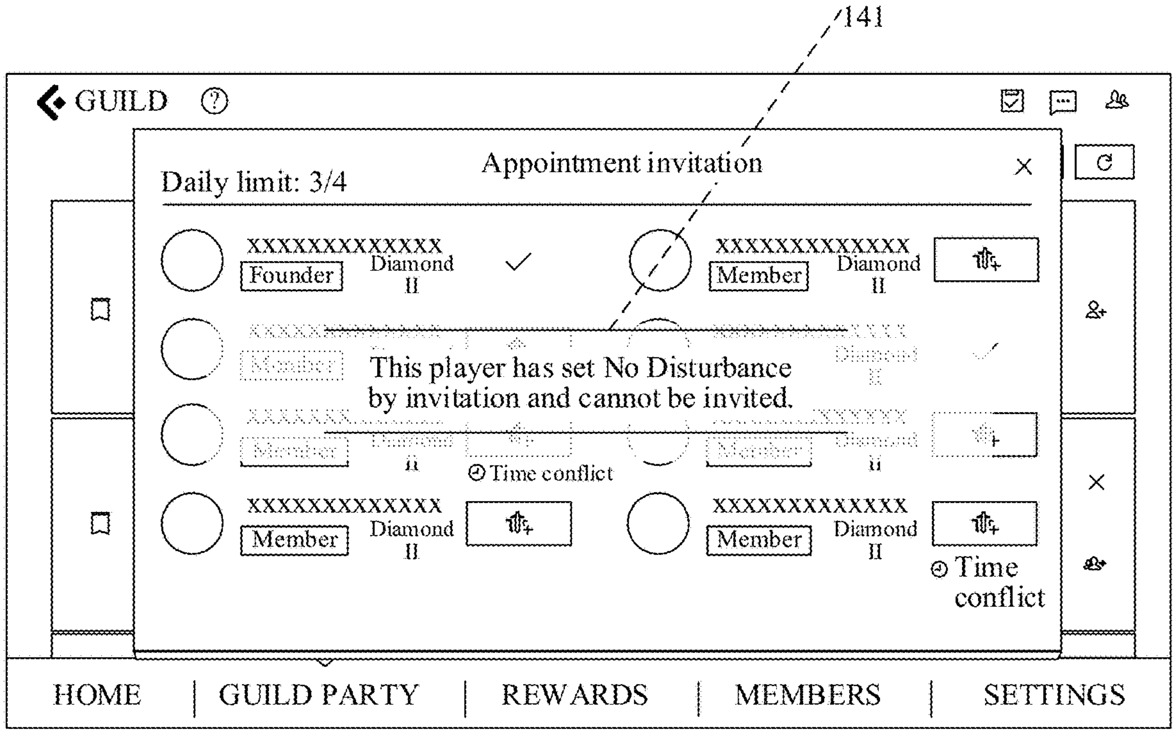
FIG. 14 is a schematic diagram of presentation of invitation prompt information according to an embodiment of this disclosure.

In practical applications, for a second player (such as a target second player), although the player is displayed as being in an invitation unavailable state, when the first player insists on inviting the target second player and triggers an invitation operation performed on the target second player, the terminal displays invitation prompt information of the corresponding target second player in response to the invitation operation performed on the target second player. The invitation prompt information is configured for promoting that the target second player is in the invitation unavailable state, and the invitation to the target second player has failed. FIG. 14 is a schematic diagram of presentation of invitation prompt information according to an embodiment of this disclosure. In conjunction with FIG. 13, when the first player clicks on 134 to trigger the invitation operation, invitation prompt information 141 shown in FIG. 14 is displayed, namely, “The player has set No Disturbance by invitation and cannot be invited”.

In some embodiments, after the first player makes an invitation on the second player, correspondingly, the terminal of the second player displays invitation information of the first player and a confirm control corresponding to the invitation information, the invitation information being configured for indicating that the first player invites the second player to join the target team; and determines, when a triggering operation performed on the confirm control is received, the triggering operation performed on the confirm control as the team applying operation. In practical applications, the terminal of the first player can transmit the invitation information in the form of an email, and correspondingly, the terminal of the second player receives the invitation information transmitted in the form of an email.

Figure 15:
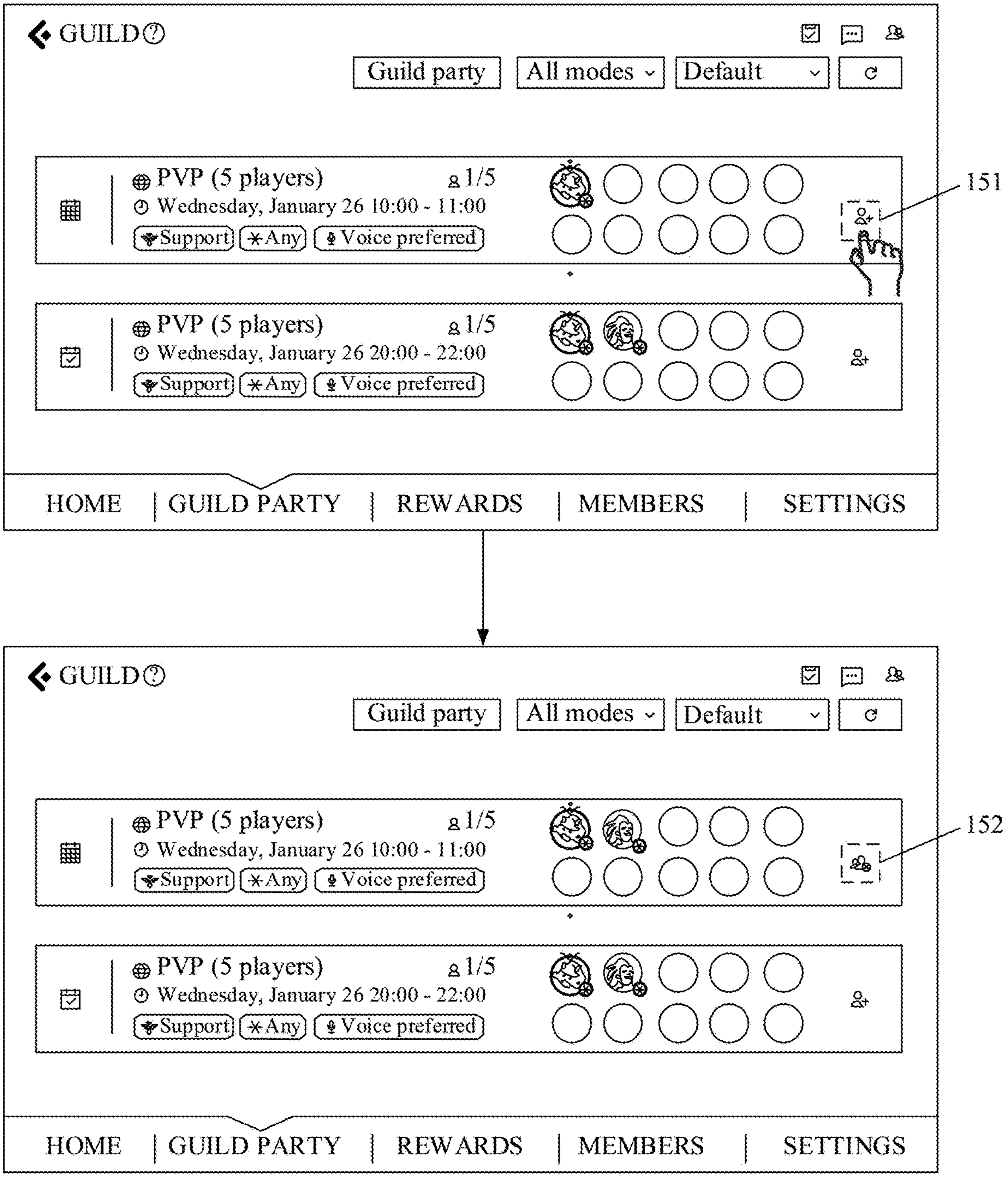
FIG. 15 is a schematic diagram of switching displaying of an applying control according to an embodiment of this disclosure.

In practical applications, after the second player applies to join the target team based on an applying control, such as the applying control 113 shown in FIG. 11, to be specific, when the applying result prompt information represents that the second player applies to join the target team successfully, the terminal the second player switches the displaying of the applying control of the target team to displaying of an applying cancel control configured for canceling applying to join the target team; and cancels the displaying of the applying result prompt information when a triggering operation performed on the applying cancel control is received. FIG. 15 is a schematic diagram of switching displaying of an applying control according to an embodiment of this disclosure. When a second player clicks on an applying control 151, the second player signs up joining of the target team. To be specific, the player identifier of the second player is displayed in a player display position. The terminal switches the displaying of the applying control 151 to displaying of an applying cancel control 152. When the second player clicks on the applying cancel control 152, the sign up is canceled.

In some embodiments, the terminal displays a team invitation interface within a target time period (which may be set according to an actual need) before the appointed formation time when the second player applies to join the target team successfully; displays a join control of the target team in the team invitation interface; and controls, when a triggering operation performed on the join control is received, the second player to join the target team.

When there is another team other than the target team at the appointed formation time, and the second player has applied to join the another team, the terminal displays a join control of the another team in the team invitation interface in the process of displaying the join control of the target team; and controls, when a triggering operation performed on the join control of the another team is received, the second player to join the another team.

Figure 16:
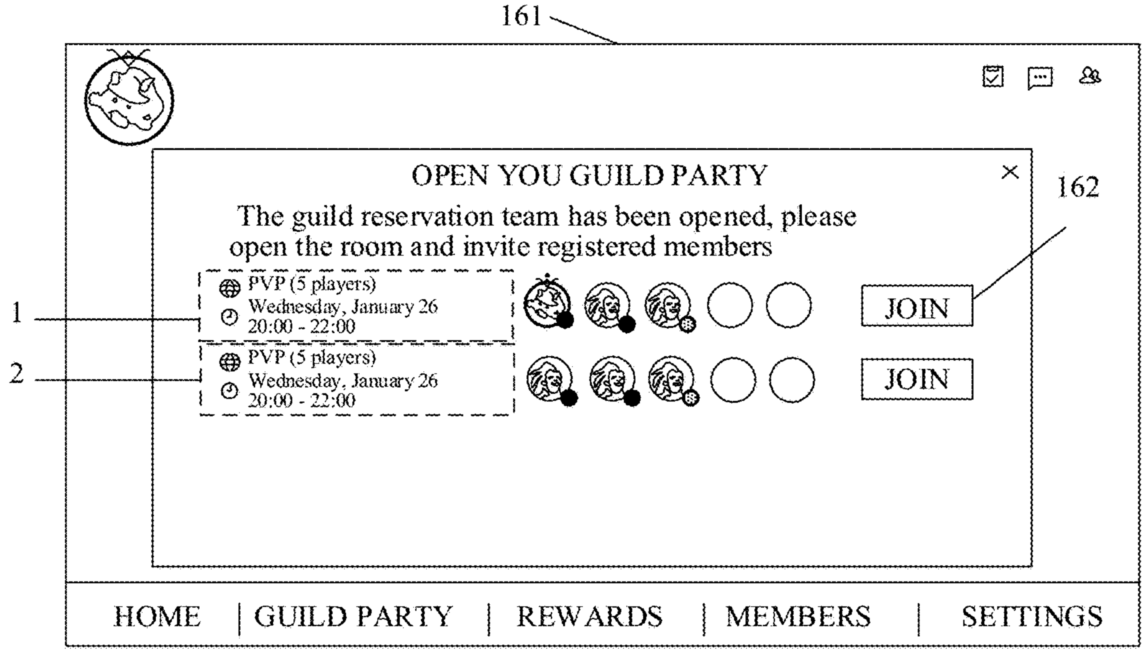
FIG. 16 is a schematic diagram of an interface of reminding joining a team according to an embodiment of this disclosure.

Exemplarily, FIG. 16 is a schematic diagram of an interface of reminding joining a team according to an embodiment of this disclosure. Referring to FIG. 16, within a target time period before the appointed formation time, for example, within 15 minutes before the appointed formation time, when the second player is online, a team invitation interface 161 is displayed, and a joining control 162 is displayed on the team invitation interface 161. When a second player has signed up two or more teams with the same appointed formation time, such as Team 1 and Team 2 in FIG. 16, joining controls corresponding to the various teams are displayed.

In some embodiments, within the target time period before the appointed formation time, the terminal of the first player will also prompt the first player. For example, the terminal of the first player displays an interaction reminder interface, and displays room creation prompt information corresponding to the target team and a corresponding creation function item in the interaction reminder interface; and creates, when a triggering operation performed on the creation function item is received, a (virtual) room configured for allowing members in the target team to interact with each other.

Figure 17A:
FIG. 17A and FIG. 17B are schematic diagrams of an interaction reminder interface according to an embodiment of this disclosure.

Player identifiers of second players that have applied to join the target team and online states of the various second players are also displayed in the interaction reminder interface. FIG. 17A is a schematic diagram of an interaction reminder interface according to an embodiment of this disclosure. Relevant information of the created target team, such as battle start time and a team interaction mode, player identifiers of second players that have applied to join the target team and the player identifier of the second player that has already applied to join the target team, and online states of the various second players are displayed in an interaction reminder interface 171 shown in FIG. 17A. For example, the second players shown in 172 are online, and the other second players are offline. Room creation prompt information 174 corresponding to the target team and a corresponding creation function item 173 are displayed in the interaction reminder interface 171. When the first player clicks on the creation function item 173, a room configured for allowing members in the target team to interact with each other.

Figure 17B:
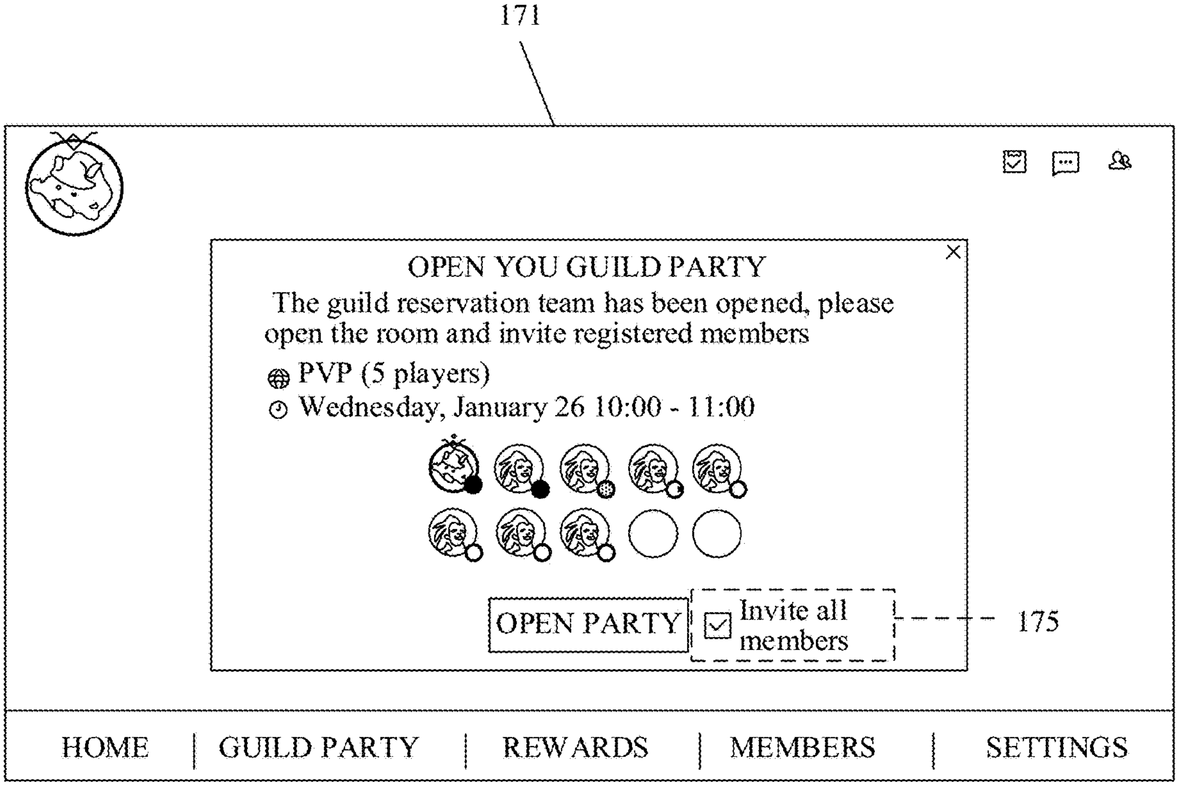

In some embodiments, an invitation option configured for inviting the second players that have applied to join the target team is also displayed on the interaction reminder interface. FIG. 17B is a schematic diagram of an interaction reminder interface according to an embodiment of this disclosure. Referring to FIG. 17B, an invitation option 175 (also referred to as invite-all option) is further displayed in the interaction reminder interface 171. When a triggering operation performed on the creation function item is received and the invitation option is in a checked state, invitation information for entering the room is transmitted to the various second players that have applied to join the target team.

Figure 18:
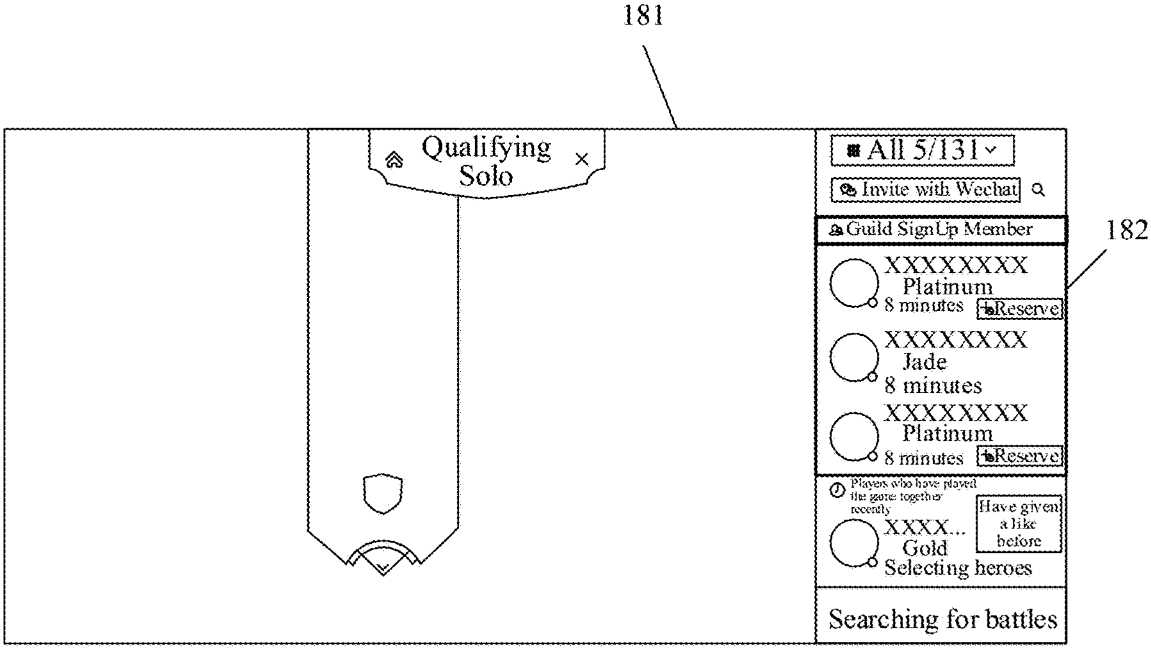
FIG. 18 is a schematic diagram of a room interface of a target team according to an embodiment of this disclosure.

After the terminal of the first player creates the room corresponding to the target team, the terminal displays a room interface of the target team, and displays a member list of the target team in the room interface; and displays, in the member list, member information of various members in the target team. In practical applications, there is an upper limit to the number of members in the target team, or the number of members in the target team is fixed. Correspondingly, when the number of the second players that have applied to join the target team is greater than the number (the maximum number) of members of the target team, the members of the target team are determined by an order in which the second players enter the room. FIG. 18 is a schematic diagram of a room interface of a target team according to an embodiment of this disclosure. Referring to FIG. 18, a member list 182 composed of second players that have entered the room and relevant information, such as the rank and the alias, of the various second players are displayed in a room interface 181 of the target team.

In some embodiments, when the triggering operation performed on the creation function item is received and the invitation option is in an unchecked state, after creating a room configured for allowing members in the target team to interact with each other, the terminal of the first player displays the room interface of the target team, and displays, in the room interface, the player identifiers and corresponding invitation controls of the various second players that have applied to join the target team; and transmits, when a triggering operation performed on the invitation control corresponding to the target second player, the invitation information for entering the room to the target second player, so as to invite the target second player to enter the room of the target team.

Figure 19:
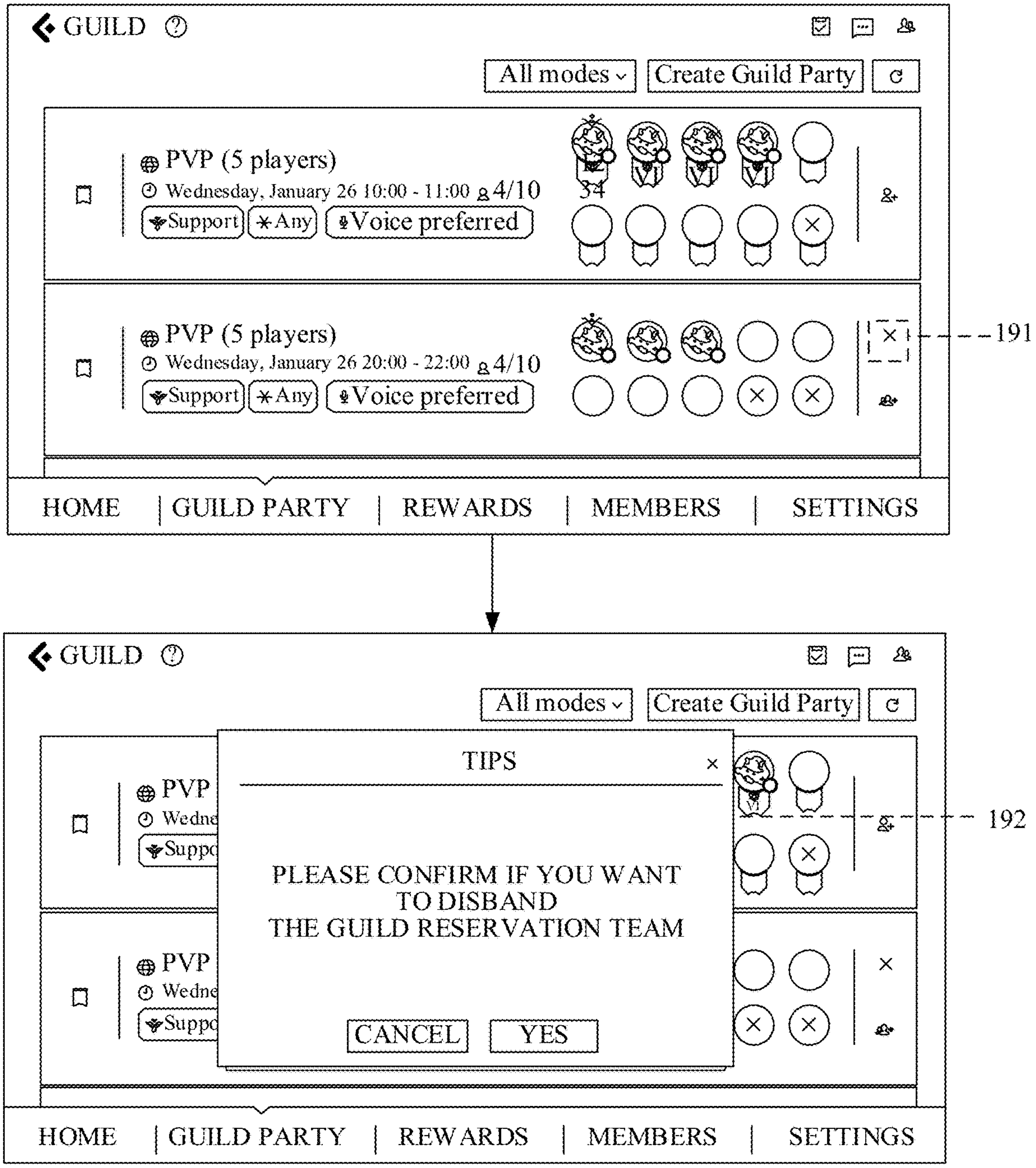
FIG. 19 is a schematic diagram of an interface of deleting a target team according to an embodiment of this disclosure.

In some embodiments, the terminal of the first player displays a deletion control for the target team, the deletion control being configured for deleting the target team appointed to be formed by the first player; and cancels the displaying of the formation appointment information when a triggering operation performed on the deletion control is received. In practical applications, when the first player triggers a deletion operation performed on the target team, the first player may be prompted to confirm whether to delete the target team appointed to be formed. FIG. 19 is a schematic diagram of an interface of deleting a target team according to an embodiment of this disclosure. Referring to FIG. 19, when the first player clicks on a deletion control 191, the terminal displays a pop-up window 192, and displays, in the pop-up window 192, prompt information configured for prompting the first player whether to delete the target team appointed to be formed, as well as a corresponding confirm button and cancel button. When the first player clicks on the confirm button, a deletion confirm instruction is triggered to cancel the displaying of the formation appointment information. When the first player clicks on the cancel button, the pop-up window 192 is closed.

The terminal of the first player obtains a time interval between a current time point and the appointed formation time when the triggering operation performed on the deletion control is received; and cancels the displaying of the formation appointment information when the time interval is greater than a time interval threshold (which may be set according to an actual need, such as 15 minutes).

Before the appointed formation time, after the first player deletes the target team, the server may generate deletion prompt information, the deletion prompt information being configured for prompting that the first player has deleted the target team appointed to be formed; and transmit the deletion prompt information to the various second players applying to join the target team. The terminals of the second players receive the deletion prompt information corresponding to the target team and display the deletion prompt information.

In some embodiments, when the number of the second players applying to join the target team reaches the number of players applying to join the target team, which is set by the first player, the formation appointment information is no longer displayed. For example, the terminal obtains the number of the second players applying to join the target team; and cancels, when the number is a target number, the displaying of the formation appointment information. Or, the server counts the number of the second players applying to join the target team in real time; and transmits, when the number is a target quantity, an instruction of canceling the displaying of the formation appointment information to the terminal of the first player and the terminals of the second players, so that the terminal of the first player and the terminals of the second player cancel the displaying of the formation appointment information.

By the embodiments of this disclosure, a function of appointing formation of a target team is provided by displaying a team formation appointment control. In response to a triggering operation performed on the team formation appointment control, an attribute setting interface is displayed, so that a user may set, based on the team formation appointment control, a team attribute, which includes appointed formation time, for a team appointed to be formed; and furthermore, when an appointment confirm instruction is triggered, formation appointment information configured for indicating formation of the target team at the appointed formation time is displayed, so that a second player can apply to join the target team based on the formation appointment information. In this way, a first player may achieve appointed team formation in a virtual scene based on the provided function of appointing formation of a target team; and the second player in the virtual scene may apply to join the target team according to the formation appointment information. The user does not need to repeatedly chat with others about team formation, so that the human-computer interaction efficiency and the team formation appointment efficiency are improved.

A processing flow of applying to join a target team will be explained below. In practical applications, when a user triggers an applying control, namely, after a user clicks on a sign up button, a sign up instruction is triggered. The terminal of a second player (the user that has signed up) may transmit a sign up request to the server in response to the sign up instruction. The server determines, based on a player identifier carried by the sign up request, whether the player meets a sign up condition, adds, when it is determined that the player meets the sign up condition, the player into Member List, and returns sign up success information to the terminal of the second player.

In some embodiments, meeting the sign up condition means meeting at least one of the following: there is no sign up time conflict, the user that has signed up is in a virtual party, the target team (a current reservation team) is in a valid state, the credit score of the user that has signed up has reached a score threshold, and the number of players that have signed up for the target team is not equal to a target number. The sign up time conflict means that the appointed formation time of the target team and target time have a conflict. The target time includes: appointed formation time of another reservation team signed up by a current second player, and appointed formation time of a reservation team created by the current second player itself. The target team being in a valid state means that the target team still exists, namely, it is not deleted by the founder.

Figure 20:
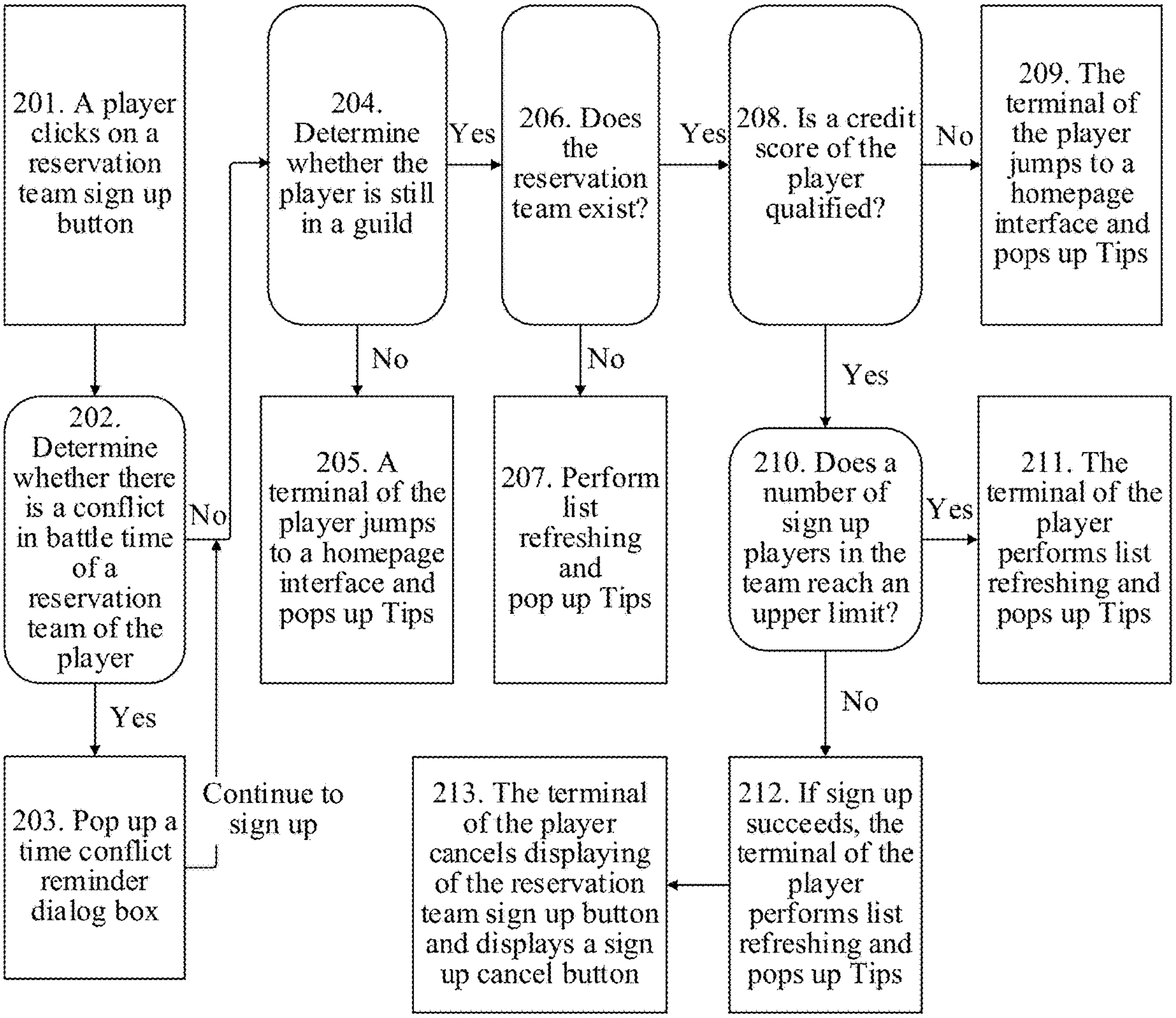
FIG. 20 is a schematic diagram of a processing flow of applying to join a target team according to an embodiment of this disclosure.

FIG. 20 is a schematic diagram of a processing flow of applying to join a target team according to an embodiment of this disclosure. The processing flow of applying to join the target team includes:

Operation 201: A player clicks on a reservation team sign up button.

When a user (player) applies to join a corresponding target team based on an applying control, for example, when the player clicks on the applying control 113 (the sign up button) in FIG. 11, a sign up (applying) instruction for the target team (i.e. the reservation team) is triggered. A terminal of a second player transmits, in response to the applying instruction, an applying request for joining the target team to the server.

Operation 202: Determine whether there is a conflict in battle time of the reservation team of the player. If yes, execute operation 203. If no, execute operation 204.

The server determines, in response to the applying request transmitted by the terminal of the second player, whether there is a conflict between appointed formation time of the target team and target time. The conflict here means whether there is a time intersection, and the target time includes: appointed formation time of another reservation team signed up by a current sign up user, and appointed formation time of a reservation team created by the current sign up user.

Operation 203: Pop up a time conflict reminder dialog box.

Figure 21:
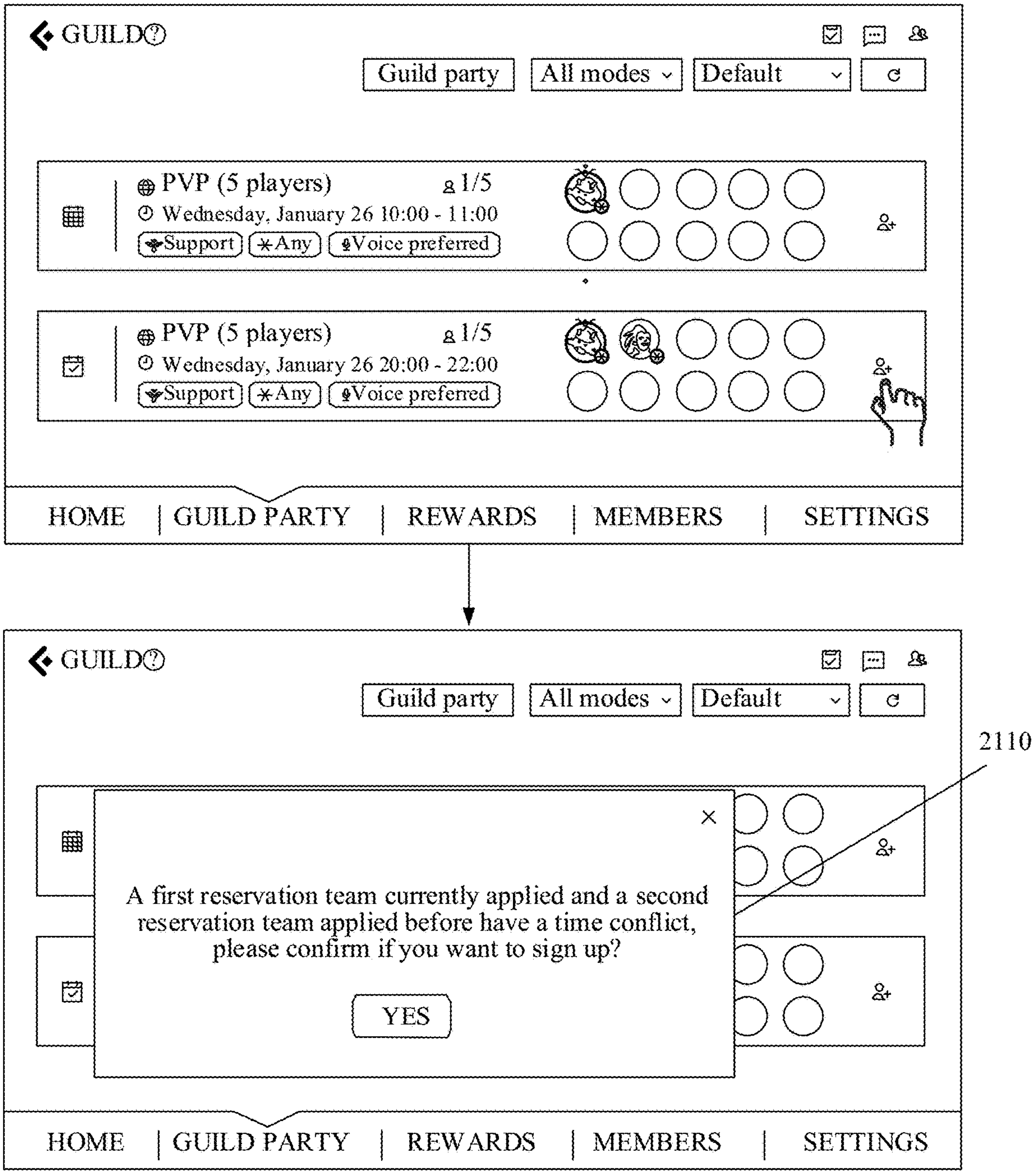
FIG. 21 is a schematic diagram of prompting a time conflict in a sign up process according to an embodiment of this disclosure.

FIG. 21 is a schematic diagram of prompting a time conflict in a sign up process according to an embodiment of this disclosure. Referring to FIG. 21, when there is a time conflict between a first reservation team that the user currently applies to join and a second reservation team that the user has applied to join before, after the user clicks on the sign up button, a time conflict reminder dialog box 2110 will pop up to ask the user whether to continue the sign up. When the user clicks on the confirm button, the sign up instruction may be triggered, namely, the user confirms to continue the sign up operation, and operation 204 is executed.

Operation 204: Determine whether the player is still in the guild. If no execute operation 205. If yes, execute operation 206.

The server determines that there is no time conflict in the battle time of the reservation team of the sign up user, or although there is a conflict, when the player continues to perform the sign up operation, the server continues to determine whether the player is still in the guild (a virtual party). If it is determined that the player has quit or is not in the virtual party, the server may transmit, to the second terminal, prompt information configured for prompting that the current user is not in the guild, so that the terminal of the second player executes operation 205. If it is determined that the player still belongs to the virtual party, the terminal of the second player executes operation 206.

Operation 205: The terminal of the player jumps to a home page interface and pops up Tips.

When the terminal of the player (i.e. the terminal of the second player) receives prompt information transmitted by the server and configured for prompting that the current user is not in the guild, the terminal jumps to the home page interface, namely, an interface corresponding to a HOME button in FIG. 21, and displays the prompt information on the interface to prompt that the user is not in the virtual party (such as a game guild) at present.

Operation 206: Determine whether the reservation team exists. If no, execute operation 207. If yes, execute operation 208.

When the server determines that the sign up user is still in the virtual party, the server determines whether the currently signed up target team, i.e. reservation team, is in a valid state, namely, whether the currently signed up target team exists, namely, whether the currently signed up target team has been deleted by the founder. When determining that the current reservation team does not exist, the server returns, to the terminal of the second player, prompt information configured for prompting that the current reservation team does not exist.

Operation 207: The terminal of the player performs list refreshing and pops up Tips.

In practical applications, when the terminal of the player (i.e. the terminal of the second player) receives the prompt information returned by the server and configured for prompting that the current reservation team does not exit, the terminal performs a refreshing operation on the formation appointment information in the virtual party interface, and displays the prompt information configured for prompting that the current reservation team does not exit.

Operation 208: Determine whether a credit score of the player is qualified. If no, execute operation 209. If yes, execute operation 210.

In practical implementation, a credit score threshold may be preset. The credit score threshold may be set according to an actual need. For example, the credit score threshold is set to 360 points. In some embodiments, when the credit score of the player reaches the credit score threshold, it is determined that the credit score of the player is qualified. In some other embodiments, in addition to detecting the credit score of the player, whether the player carries a black production mark is also detected. When the credit score of the player reaches the credit score threshold and the player does not carry the black production mark, it is determined that the credit score of the player is qualified.

The black production mark here is configured for indicating that the corresponding user (player) has a target behavior history. The target behavior history may be an abnormal interaction behavior in the virtual scene, such as a cheating behavior, an account theft behavior, and a private server behavior. The cheating behavior means using third-party software or a program to modify game data and tamper with normal settings and rules of a game to enhance the skills of a game character abnormally. A private server is essentially a pirated game. To be specific, without permission, after illegally obtaining an installation program of a game server end, a user sets up a network server privately for use by other players.

In practical applications, when the server determines that the credit score of the player is not qualified, the server transmits, to the terminal of the second player, corresponding prompt information configured for prompting that the credit score of the player is not qualified.

Operation 209: The terminal of the player jumps to a home page interface and pops up Tips.

When the terminal of the player (i.e. the terminal of the second player) receives the prompt information transmitted by the server and configured for prompting that the credit score of the player is not qualified, the terminal may jump from the virtual party interface to the home page interface, i.e. the interface corresponding to the HOME button in FIG. 13, and displays the prompt information in the interface to prompt that the user has a too low credit score to join the team.

Operation 210: Determine whether the number of sign up players in the team reaches an upper limit. If yes, execute operation 211. If no, execute operation 212.

After determining that the credit score of the player is qualified, the server determines whether the number of players that have signed up for the current reservation team reaches the upper limit, transmits prompt information indicating that sign up succeeds to the terminal of the player when determining that the number of players does not reach the upper limit, and transmits, if the current number of players reaches the upper limit, corresponding prompt information configured for prompting that the number of players reaches the upper limit to the terminal of the player.

Operation 211: The terminal of the player performs list refreshing and pops up Tips.

In practical applications, when the terminal of the player (i.e. the terminal of the second player) receives the prompt information returned by the server and configured for prompting that the number of players reaches the upper limit, the terminal of the player performs a refreshing operation on the formation appointment information in the virtual party interface, and displays the prompt information configured for prompting that the current reservation team is full and sign up fails.

Operation 212: If sign up succeeds, the terminal of the player performs list refreshing and pops up Tips.

In practical applications, when the terminal of the player receives the prompt information returned by the server and configured for prompting that sign up succeeds, the terminal of the player performs a refreshing operation on the formation appointment information in the virtual party interface, and displays the prompt information configured for prompting that the player has signed up successfully.

Operation 213: The terminal of the player cancels the displaying of the reservation team sign up button and displays a sign up cancel button.

In practical applications, when the player signs up successfully, the terminal of the player cancels the displaying of the reservation team sign up button, and displays the sign up cancel button after certain time (which may be set according to an actual need, such as 3 seconds), so as to facilitate canceling the sign up for the reservation team when the plane of the player changes.

Figure 22:
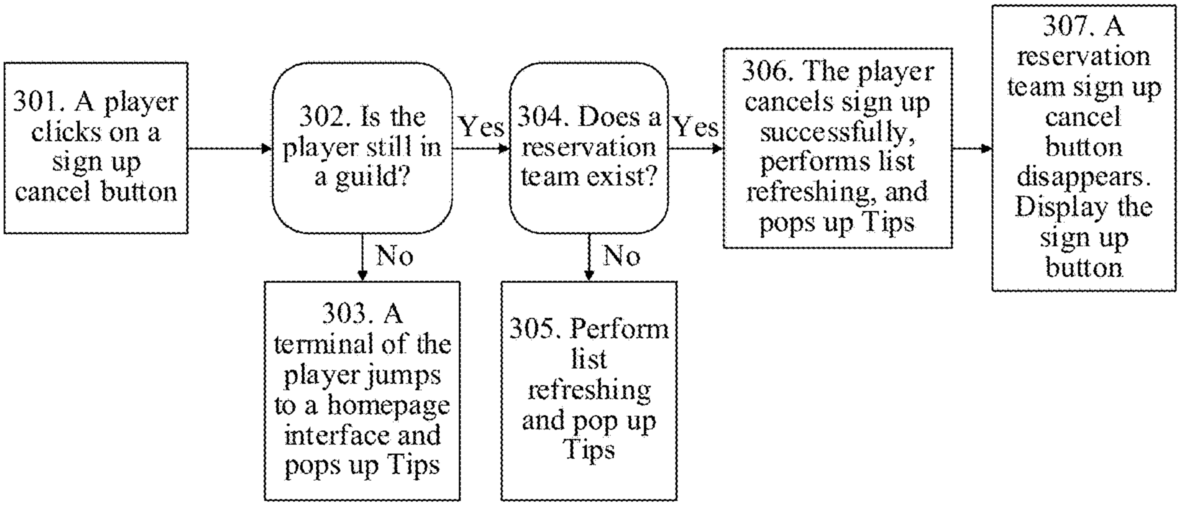
FIG. 22 is a schematic diagram of a processing flow of canceling joining a target team according to an embodiment of this disclosure.

Based on the above processing flow of applying to join the target team, a processing flow of canceling joining the target team will be explained. FIG. 22 is a schematic diagram of a processing flow of canceling joining a target team according to an embodiment of this disclosure. The processing flow of canceling joining the target team includes:

Operation 301: A player clicks on a sign up cancel button.

When a user (the player) intends to cancel the target team that the user has signed up for (applied to join), the sign up cancel button displayed on the terminal of the player may be triggered. For example, the sign up cancel button is clicked to trigger a sign up cancel instruction. Correspondingly, the terminal of the player may transmit a sign up cancel request to the server.

Operation 302: Determine whether the player is still in the guild. If no execute operation 303. If yes, execute operation 304.

When the server receives the sign up cancel request transmitted by the terminal of the player, the server may determine whether the player is still in the guild (virtual party). If it is determined that the player has quit or is not in the virtual party, the server transmits, to the terminal of the player, prompt information configured for prompting that the current user is not in the guild.

Operation 303: The terminal of the player jumps to a home page interface and pops up Tips.

When the terminal of the player receives prompt information transmitted by the server and configured for prompting that the current user is not in the guild, the terminal jumps to the home page interface, namely, an interface corresponding to a HOME button in FIG. 13, and displays the prompt information on the interface to prompt that the user is not in the virtual party (such as a game guild) at present.

Operation 304: Determine whether the reservation team exists. If no, execute operation 305. If yes, execute operation 306.

When the server determines that the sign up user is still in the virtual party, the server determines whether the currently signed up target team, i.e. reservation team, is in a valid state, namely, whether the currently signed up target team exists, namely, whether the currently signed up target team has been deleted by the founder. When determining that the current reservation team does not exist, the server returns, to the terminal of the second player, prompt information configured for prompting that the current reservation team does not exist. When it is determined that the current reservation team exists, the server returns prompt information configured for prompting that sign up succeeds to the terminal of the player.

Operation 305: Perform list refreshing and pop up Tips.

In practical applications, when the terminal of the player receives the prompt information returned by the server and configured for prompting that the current reservation team does not exit, the terminal performs a refreshing operation on the formation appointment information in the virtual party interface, and displays the prompt information configured for prompting that the current reservation team does not exit.

Operation 306: If sign up cancellation succeeds, perform list refreshing and pop up Tips.

When the terminal of the player receives the prompt information returned by the server and configured for prompting that the player cancels sign up successfully, the terminal of the player performs a refreshing operation on the formation appointment information in the virtual party interface, and displays the prompt information configured for prompting that the player cancels sign up successfully.

Operation 307: The reservation team sign up cancel button disappears. Display a sign up button.

In practical applications, when the player cancels sign up successfully, the terminal of the player cancels the displaying of the sign up cancel button, and displays the reservation team sign up button after certain time (which may be set according to an actual need, such as 5 seconds), so as to facilitate the user to sign up for the reservation team again.

By the above embodiments of this disclosure, the user clicks on the reservation team sign up button (the team formation appointment control). Due to the judgment on many aspects such as the time conflict, whether the player is in the guild, the existence of the reservation team, the credit score of the player, and the number of players that have signed up, sign up for the reservation team is finally achieved. This provides a convenient way for the user to sign up and also ensures that members joining the reservation team meet preset sign up conditions. A sign up user does not need to repeatedly chat with a founder about the team formation, so that the human-computer interaction efficiency and the appointed team formation efficiency are improved.

An exemplary application of the embodiments of this disclosure in a practical application scene will be explained below. The virtual scene being a game is taken as an example. The team formation appointment method in the virtual scene according to an embodiment of this disclosure will be explained. The team formation appointment scheme in the virtual scene according to an embodiment of this disclosure is asynchronous team formation. This completely solves the problem that a player needs to wait other players online and in real-time. An initiator or players intending to participate in team formation may make an appointment to form a team in the game. Meanwhile, an inviter may alternatively invite other guild members to make an appointment to form a team by emails. Before appointed time, the server may remind all the players that have made an appointment to form a team and help the initiator quickly invite all other participating guild players to join the team.

Firstly, the team formation appointment scheme in the virtual scene will be explained first from the perspective of human-computer interaction. There is a game guild in the game, and there is a guild system in a game client, such as GUILD PARTY in FIG. 5. The guild system has a team formation appointment function, such as the control 53 provided in FIG. 5. Based on this control, a player (corresponding to the first player in the previous text) initiates a teaming formation appointment. Other members (second players) who are in the same game guild as the player may make a response in advance the team formation, to be specific, sign up for a reservation team. In practical applications, the first player may set the number of players that may sign up for the reservation team. The set number of players that may sign up for the reservation team may be greater than the number of members in the reservation team.

In actual implementation, when the player clicks on a control for team formation appointment, an attribute setting interface configured for setting a team attribute is displayed, as shown in FIG. 6. The player may set the team attribute according to an own need, such as a battle mode (i.e. the team interaction mode), the number of open members (i.e. the number of team members), the number of sign up players (i.e. the number of players that apply to join a team), battle start time of the battle (i.e. appointed formation time), ranked requirements (the ranks of the players that apply to join a team), and party tag (i.e. party tag).

When the player triggers an appointment confirm instruction, such as clicking on the OPEN PARTY button in FIG. 6, team appointment is achieved. Formation appointment information, such as 112 in FIG. 11, of a reservation team is displayed on game guild interfaces (i.e. GUILD PARTY interface) of the various members are displayed in the game guild. The terminals of other players except the founder in the game guild also display sign up controls, such as 113 in FIG. 11 when displaying the formation appointment information. The players may click on the sign up controls to sign up. The terminal of the founder of the team may alternatively display an invitation control, such as 122 in FIG. 12, in addition to displaying the formation appointment information. The founder of the reservation team may transmit an invitation of team formation appointment to other players by emails, and if a player accepts the invitation, it means that the player signs up for the reservation team. However, during data analysis, two clients (the founder client and the sign up client) will be separately counted.

If the founder of the reservation team is in the home page interface or returns to the home page interface within a period of time (such as 15 minutes) before the battle start time of the reservation team till team recovery (such as a period of time after the battle start time, such as 5 minutes), and the founder is not in the room of the reservation team, a dialog box will pop up. This dialog box will be displayed once every time the founder switches back, as shown in FIG. 17A and FIG. 17B.

A dialog box of battle start invitation may pop up, before the reservation team starts the battle, on the terminals of all online players that have receive an invitation of team formation appointment to start the battle, or the terminals of the players that have signed up to join the reservation team, so as to prompt the players to join the reservation team, as shown in FIG. 16.

When the players are in the room of the reservation team, a list of sign up players may be added to a list on the right hand side of the room, put in the first place, and displayed by default. Information displayed for each player in the list is the same as that in the list of guild members or that in the list of friends, as shown in FIG. 18.

Next, after the players trigger a team formation appointment instruction and the terminals of the players transmit appointment requests to the server, the processing logic of the server will be explained below.

In practical applications, the server adopts a double-list form, which records a list of reservation teams in a guild according to a chronological order of starting the battle. Each team records a sequence of players in the guild according to a sign up sequence. The founder is considered as the first sign up player by default, as shown in FIG. 10. Creating a reservation team and deleting a reservation team are both operations on the team list. Information in the list may be visually presented on the interface of the game client. The server may update the team list in real time and synchronize the updated team list to the game client.

In practical applications, after receiving an appointment request transmitted by a terminal of a player, the server detects a current team state of the player. Each player can only create one reservation team on each natural day. When it is detected that the player has not made an appointment to form a team on the current natural day, the server creates a corresponding reservation team in response to the appointment request. After the team is created, the founder may be the first sign up player in the team, and the founder cannot cancel the sign up subsequently. Correspondingly, the founder has the permission to delete the team.

To delete a team, the operator needs to be the founder of the team and a duration from the battle start time needs to be greater than a time threshold (such as 15 minutes). After the team is deleted, the client will communicate with the server. After confirming that the deletion is valid (namely, the conditions are met: the operator needs to be the founder of the team and the duration from the battle start time needs to be greater than the time threshold), the server may transmit a private message to other sign up players. The private message is configured for prompting that the founder has deleted the reservation team. The clients of other players may receive this message when logging in.

The battle start time may be set when each team is created. The server may provide a battle start reminder according to this timestamp. To be specific, at the battle start time, the server may transmit, according to the team, a reminder of building or entering the room to each player. After the client receives the reminder, a pop-up window is displayed, thus ultimately completing the entire logic loop.

The flows that the players sign up to join the reservation team and cancel joining the reservation team are shown in FIG. 20 and FIG. 22. In the flows, the client and the server need to establish communication only once. The server may transmit a final result to the game client according to the above flow of the game client. The game client may provide a final feedback to the player according to a logical meaning of this result. These results are logically mutually exclusive.

Users on which a player performs the team formation appointment are not limited to members in the game guild. In some embodiments, the team formation appointment is available to all players in the game.

By the above embodiments of this disclosure, the players in the game can conveniently make an appointment to form a team at future time, and can receive automatic reminders before expiration. As the user does not need to repeatedly chat with other users about team formation, the human-computer interaction efficiency and the appointed team formation are improved.

The following will continue to explain an exemplary structure that a team formation appointment apparatus 555 in a virtual scene according to an embodiment of this disclosure is implemented as software modules. In some embodiments, the team formation appointment apparatus in the virtual scene according to an embodiment of this disclosure includes: a first display module 5551, an attribute setting module 5552, and a processing module 5553.

The first display module 5551 is configured to display a team formation appointment control of a first player, the team formation appointment control being configured for making an appointment on forming a target team including the first player;

the attribute setting module 5552 is configured to determine a set attribute as a team attribute of the target team based on the team formation appointment control in response to a team attribute setting operation, the team attribute at least including appointed formation time of the target team; and the processing module 5553 is configured to display, in response to an appointment confirm instruction triggered based on the set team attribute, formation appointment information carrying the team attribute, the formation appointment information being configured for indicating formation of the target team including the first player at the appointed formation time and configured for allowing a second player to apply to join the target team based on the formation appointment information.

In some embodiments, the above team formation appointment apparatus further includes a second display module, configured to: display, in response to a triggering operation performed on the team formation appointment control, an attribute setting interface configured for setting the team attribute of the target team; and receive the team attribute setting operation in the attribute setting interface.

In some embodiments, the first display module is further configured to: display a virtual party interface corresponding to a virtual party, the first player belonging to the virtual party; and display the team formation appointment control in the virtual party interface.

In some embodiments, the team attribute setting operation includes a first setting operation and a second setting operation; and the attribute setting module is further configured to: display, in the attribute setting interface, a time function item configured for setting the appointed formation time, and display, in the attribute setting interface, an attribute function item configured for setting at least one of the following team attributes:

a team interaction mode, the number of team members, the number of players applying to join the target team, ranks of players applying to join the target team, and a party tag;

receive, based on the time function item, the first setting operation performed on the appointed formation time; and receive, based on the attribute function item, the second setting operation performed on the team attribute.

In some embodiments, when the team attribute includes the party tag, and a tag function item configured for setting the party tag is displayed in the attribute setting interface, the attribute setting module is further configured to: display, in response to a triggering operation performed on the tag function item, a tag selection interface that includes at least two party tags; and determine, in response to a selection operation performed on a target party tag of the at least two party tags, the target party tag as the party tag of the target team.

In some embodiments, the apparatus further includes:

an invitation module, configured to: display an invitation function item of the target team in an associated region of the formation appointment information, the invitation function item being configured for inviting at least one second player to join the target team;

display, when a triggering operation performed on the invitation function item is received, a player invitation interface including at least one second player; and based on the player invitation interface, display, in response to an invitation operation performed on a target second player, invitation prompt information configured for prompting an invitation result for the target second player.

In some embodiments, the invitation module is further configured to: display player identifiers of the various second players in the player invitation interface, and display a corresponding player invitation function item in an associated region of the player identifiers; and in response to a triggering operation performed on a target player invitation function item corresponding to the target second player, determine the triggering operation, performed on the target player invitation function item, as the invitation operation performed on the target second player.

In some embodiments, the invitation module is further configured to display at least one piece of the following player prompt information of each second player in the player invitation interface:

when the second player has already applied to join another team with a formation time conflicting with the appointed formation time, first prompt information configured for prompting a time conflict; and when the second player is in an invitation unavailable state, second prompt information configured for prompting that the second player is in the invitation unavailable state.

In some embodiments, when the target second player is in an invitation unavailable state, the invitation module is further configured to display the invitation prompt information corresponding to the target second player in response to the invitation operation performed on the target second player; and the invitation prompt information is configured for promoting that the target second player is in the invitation unavailable state, and the invitation to the target second player has failed.

In some embodiments, the apparatus further includes:

a reminding module, configured to: display an interaction reminder interface within a target time period before the appointed formation time, and display room creation prompt information corresponding to the target team and a corresponding creation function item in the interaction reminder interface; and a room creation module, configured to create, when a triggering operation performed on the creation function item is received, a room configured for allowing members in the target team to interact with each other.

In some embodiments, the reminding module is further configured to: display, in the interaction reminder interface, the player identifiers of second players that have applied to join the target team, and display an invitation option configured for inviting the second players that have applied to join the target team;

when a triggering operation performed on the creation function item is received and the invitation option is in a checked state, transmit invitation information for entering the room to the various second players that have applied to join the target team.

In some embodiments, the room creation module is further configured to: display a room interface of the target team, and display a member list of the target team in the room interface;

display, in the member list, member information of various members in the target team;

wherein when the number of the second players that have applied to join the target team is greater than the number of members of the target team, the members of the target team are determined by an order in which the second players enter the room.

In some embodiments, when the triggering operation performed on the creation function item is received and the invitation option is in an unchecked state, the room creation module is further configured to: display the player identifiers and corresponding invitation controls of the various second players that have applied to join the target team; and transmit, when a triggering operation performed on the invitation control corresponding to the target second player, the invitation information for entering the room to the target second player.

In some embodiments, the apparatus further includes:

a deletion module, configured to: display a deletion control for the target team, and cancel the displaying of the formation appointment information when a triggering operation performed on the deletion control is received;

or, a deletion module, configured to: obtain the number of second players applying to join the target team, and cancel the displaying of the formation appointment information when the number is a target number.

In some embodiments, the deletion module is further configured to: obtain a time interval between a current time point and the appointed formation time when the triggering operation performed on the deletion control is received; and cancel the displaying of the formation appointment information when the time interval is greater than a time interval threshold.

In some embodiments, the processing module is further configured to: obtain, in response to the appointment confirm instruction triggered based on the set team attribute, the number of teams appointed to be formed by the first player within a target time period; and display, when the number is less than or equal to a number threshold, the formation appointment information carrying the team attribute. In some embodiments, the team formation appointment apparatus may further include a prompt module, configured to display formation prompt information when the number is greater than the number threshold, the formation prompt information being configured for prompting that the number of the teams formed by the first player has reached an upper limit.

The team formation appointment 556 in the virtual scene according to an embodiment of this disclosure will be continued to be explained. The team formation appointment 556 in the virtual scene according to an embodiment of this disclosure include:

a third display module 5561, configured to display formation appointment information carrying a team attribute of a target team;

the team attribute at least including an appointed formation time, and the formation appointment information being configured for indicating formation of the target team including the first player at the appointed formation time; and an applying module 5562, configured to display applying result prompt information of the second player when a team applying operation triggered by a second player based on the formation appointment information is received, the applying result prompt information being configured for prompting a result of applying to join the target team by the second player.

In some embodiments, when the team attribute includes the number of players applying to join the target team, and the number of players applying to join the target team is a target number, the third display module is further configured to: display the target number of player display positions, and display, in the player display positions, player identifiers of virtual players that have applied to join the target team, the player identifiers and the player display positions being in a one-to-one correspondence relationship; and the applying module is further configured to: when the applying result prompt information represents that the second player applies to join the target team successfully and the target number of player display positions include a display vacancy, display the player identifier of the second player in the display vacancy to prompt that the second player applies to join the target team successfully.

In some embodiments, the third display module is further configured to: display an applying control of the target team, the applying control being configured for applying to join the target team; and determine the triggering operation as the team applying operation when a triggering operation performed by the second player on the applying control is received.

In some embodiments, the third display module is further configured to: switch, when the applying result prompt information represents that the second player applies to join the target team successfully, the displaying of the applying control of the target team to displaying of an applying cancel control configured for canceling applying to join the target team; and cancel the displaying of the applying result prompt information when a triggering operation performed on the applying cancel control is received.

In some embodiments, the third display module is further configured to: display a virtual party interface of the second player, a virtual party corresponding to the virtual party interface including the first player and the second player; and display, in the virtual party interface, the formation appointment information carrying the team attribute of the target team.

In some embodiments, the third display module is further configured to: display invitation information of the first player and a confirm control corresponding to the invitation information, the invitation information being configured for indicating that the first player invites the second player to join the target team; and determine, when a triggering operation performed on the confirm control is received, the triggering operation performed on the confirm control as the team applying operation.

In some embodiments, the third display module is further configured to: display a team invitation interface within a target time period before the appointed formation time when the applying result prompt information represents that the second player applies to join the target team successfully; and display a join control of the target team in the team invitation interface; and when a triggering operation performed on the join control is received, the applying module is further configured to control the second player to join the target team.

In some embodiments, the third display module is further configured to: when there is another team other than the target team at the appointed formation time, and the second player has applied to join the another team, display a join control of the another team in the team invitation interface in the process of displaying the join control of the target team; and when a triggering operation performed on the join control of the another team is received, the applying module is further configured to control the second player to join the another team.

In some embodiments, the apparatus further includes:

a receiving module, configured to: when the first player has deleted the target team appointed to be formed before the appointed formation time, receive deletion prompt information corresponding to the target team; and the deletion prompt information being configured for prompting that the first player has deleted the target team appointed to be formed.

The embodiments of this disclosure further provide an electronic device. The electronic device includes:

a memory, configured to store executable instructions; and a processor (also referred to as processing circuitry in some examples), configured to implement, when executing the executable instructions stored in the memory, the team formation appointment method in the virtual scene provided by the embodiments of this disclosure.

The embodiments of this disclosure further provide a computer program product or a computer program. The computer program product or computer program includes computer instructions which are stored in a computer-readable storage medium. A processor of a computer device reads the computer instructions from the computer-readable storage medium and executes the computer instructions, causing the computer device to implement the team formation appointment method in the virtual scene provided by the embodiments of this disclosure.

The embodiments of this disclosure further provide a non-transitory computer-readable storage medium, having executable instructions stored therein. The executable instructions, when executed by a processor, implement the team formation appointment method in the virtual scene provided by the embodiments of this disclosure.

In some embodiments, the non-transitory computer-readable storage medium may be a memory such as a read-only memory (ROM), a random access memory (RAM), an erasable programmable read-only memory (EPROM), an electrically erasable programmable read-only memory (EEPROM), a flash memory, a magnetic surface memory, an optic disc, or a compact disc read-only memory (Compact Disc Read-Only Memory, CD-ROM). The computer-readable storage medium may include one or any combination of the aforementioned memories.

In some embodiments, the executable instructions may be in the form of programs, software, software modules, scripts, or codes, written in any form of programming language (including a compiling or interpreting language, or a declarative or procedural language), and may be deployed in any form, including being deployed as standalone programs or as modules, components, subroutines, or other units suitable for use in computing environments.

As an example, the executable instructions may, but may not necessarily correspond to files in a file system, and may be stored as part of a file that stores other programs or data, such as in one or more scripts stored in a Hyper Text Markup Language (HTML) document, in a single file dedicated to a discussed program, or in multiple collaborative files (such as files that store one or more modules, subroutines, or codes).

As an example, the executable instructions may be deployed on one computing device for execution, or on a plurality of computing devices located at one site, or on a plurality of computing devices distributed at a plurality of sites and interconnected by a communication network.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

The foregoing descriptions are merely embodiments of this disclosure and are not intended to limit the protection scope of this disclosure. Any modification, equivalent replacement, and improvement made within the spirit and scope of this disclosure shall fall within the protection scope of this disclosure.

What is claimed is:

1. A method for team formation appointment, comprising:

displaying, by an electronic device associated with a first player of a game application that supports team-based battles, a team formation appointment control element, the team formation appointment control element being associated with an appointment creation function that is configured to form a target team comprising the first player;

displaying an attribute setting interface of the appointment creation function when the team formation appointment control element is selected by the first player;

receiving one or more team attribute setting operations via the attribute setting interface;

determining a set of team attributes of the target team based on the one or more team attribute setting operations, the set of team attributes comprising at least an appointed formation time of the target team; and causing, when an appointment confirm instruction is triggered, formation appointment information of the target team to be generated and displayed based on the set of team attributes, the formation appointment information indicating a formation of attributes of the target team with the first player to be formed at the appointed formation time, wherein a request from a second player to join the target team is received based on the formation appointment information.

2. The method according to claim 1, wherein the displaying the team formation appointment control element comprises:

displaying a virtual party interface of the game application; and displaying the team formation appointment control element in the virtual party interface.

3. The method according to claim 1, wherein the set of team attributes comprises the appointed formation time and at least a second team attribute from a team interaction mode, a number of team members, a number of applicants to join the target team, ranks of the applicants to join the target team, and a party tag, the method further comprises:

displaying, in the attribute setting interface, a plurality of function items configured for setting the set of team attributes of the target team, the plurality of function items comprising a time function item for setting the appointed formation time, and at least a second function item for setting at least the second team attribute;

receiving, based on the time function item, a first setting operation that sets the appointed formation time; and receiving, based on the second function item, a second setting operation that sets the second team attribute.

4. The method according to claim 3, wherein the second team attribute is the party tag, and the second function item is a tag function item, the method further comprises:

displaying, when a triggering operation is performed on the tag function item, a tag selection interface that comprises at least two party tags; and determining, when a selection operation is performed on a target party tag in the at least two party tags, the target party tag as the party tag of the target team.

5. The method according to claim 1, further comprising:

displaying an invitation function item of the target team in an associated region of the formation appointment information, the invitation function item being configured for inviting at least another player to join the target team;

displaying, when a triggering operation is performed on the invitation function item, a player invitation interface comprising one or more candidate team players for inviting; and based on the player invitation interface, displaying, when an invitation operation is performed to a candidate team player of the one or more candidate team players in the player invitation interface, invitation prompt information configured for prompting an invitation result for the candidate team player.

6. The method according to claim 5, further comprising:

displaying player identifiers of the one or more candidate team players in the player invitation interface;

displaying player invitation function items in respective associated regions of the player identifiers; and when a triggering operation is performed on a first candidate player invitation function item that is in an associated region of a first candidate player identifier of a first candidate team player in the one or more candidate team players, determining to invite the first candidate team player.

7. The method according to claim 5, further comprising:

displaying, when the candidate team player has applied to join another team with a time conflict to the appointed formation time, first prompt information indicating the time conflict;

and/or displaying, when the candidate team player is in an invitation unavailable state, second prompt information indicating that the candidate team player is in the invitation unavailable state.

8. The method according to claim 1, further comprising:

displaying room creation prompt information of the target team and a creation function item associated with the room creation prompt information within a target time period before the appointed formation time; and creating, when a triggering operation is performed on the creation function item, a virtual room configured to allow members in the target team to interact with each other.

9. The method according to claim 8, wherein the room creation prompt information and the creation function item are displayed in an interaction reminder interface, the method further comprises:

displaying, in the interaction reminder interface, player identifiers of applicant players that have applied to join the target team;

displaying an invite-all option configured for inviting the applicant players all at once; and when a triggering operation is performed on the creation function item and the invite-all option is in a checked state, transmitting invitation information for entering the virtual room to the applicant players.

10. The method according to claim 9, further comprising:

displaying a member list of the target team that includes member players in the target team, and respective member information of the member players;

wherein when a number of the applicant players is greater than a number of members of the target team, the member players of the target team are determined by an order in which the applicant players enter the virtual room.

11. The method according to claim 9, further comprising:

displaying, when the invite-all option is in an unchecked state, respective invitation controls of the applicant players that have applied to join the target team; and transmitting, when a triggering operation is performed on a first invitation control of a first applicant player in the applicant players, the invitation information for entering the virtual room to the first applicant player.

12. The method according to claim 1, further comprising at least one of:

stopping the formation appointment information from being displayed when a triggering operation is performed on a deletion control associated with the target team; and/or stopping the formation appointment information from being displayed when a number of applicant players reaches a target number.

13. The method according to claim 1, wherein the causing the formation appointment information to be generated and displayed comprises:

obtaining, when the appointment confirm instruction is triggered, a count of teams that have been appointed to be formed by the first player within a target time period; and causing the formation appointment information to be generated and displayed when the count is less than or equal to a number threshold.

14. A method for team formation appointment, comprising:

receiving, by an electronic device associated with a specific player of a game application that supports team-based battles, formation appointment information of a target team in the game application, the target team comprising at least a first team player, the formation appointment information comprising a set of team attributes of the target team, the set of team attributes including at least an appointed formation time of the target team;

displaying the formation appointment information of the target team;

transmitting, by the electronic device, a request from the specific player to join the target team based on the displayed formation appointment information; and displaying applying result prompt information of the specific player, the applying result prompt information indicating a result of the specific player applying to join the target team.

15. The method according to claim 14, further comprising:

displaying a predefined target number of player display positions, each player display position being a display vacancy or including a player identifier of an applicant player applying to join the target team; and when the specific player successfully applies to join the target team and the predefined target number of player display positions comprise at least a first player display position that is a display vacancy, displaying a specific player identifier of the specific player at the first player display position.

16. The method according to claim 14, the method further comprising:

displaying an applying control of the target team, the applying control being configured for applying to join the target team; and determining to apply to join the target team when a triggering operation is performed on the applying control.

17. The method according to claim 16, further comprising:

displaying, when the applying result prompt information indicates that the specific player successfully applies to join the target team, an applying cancel control in a place of the applying control, the applying cancel control being configured for canceling an application to join the target team; and stopping the applying result prompt information from being displayed when a triggering operation is performed on the applying cancel control.

18. The method according to claim 14, wherein the displaying the formation appointment information comprises:

displaying a virtual party interface that includes at least the target team; and displaying, in the virtual party interface, the formation appointment information including the set of team attributes of the target team.

19. The method according to claim 14, the method further comprising:

displaying invitation information of the first team player and a confirm control associated with the invitation information, the invitation information indicating that the first team player invites the specific player to join the target team; and determining, when a triggering operation is performed on the confirm control, to apply to the target team.

20. A non-transitory computer-readable storage medium storing instructions which, when executed by a processor, cause the processor to perform method for team formation appointment, the method comprising:

displaying a team formation appointment control element to a first player of a game application that supports team-based battles, the team formation appointment control element being associated with an appointment creation function that is configured to form a target team comprising the first player;

displaying an attribute setting interface of the appointment creation function when the team formation appointment control element is selected by the first player;

receiving one or more team attribute setting operations via the attribute setting interface;

determining a set of team attributes of the target team based on the one or more team attribute setting operations, the set of team attributes comprising at least an appointed formation time of the target team; and causing, when an appointment confirm instruction is triggered, formation appointment information of the target team to be generated and displayed based on the set of team attributes, the formation appointment information indicating attributes of the target team with the first player to be formed at the appointed formation time, wherein a request from a second player to join the target team is received based on the formation appointment information.

* * * * *